US011465865B2

(12) United States Patent  (10) Patent No.: US 11,465,865 B2
Gadbois et al.  (45) Date of Patent: Oct. 11, 2022

(54) VEHICLE RESTRAINT SYSTEM

(71) Applicant: Systems, LLC, Germantown, WI (US)

(72) Inventors: Jean Gadbois, Roxboro (CA); John Schlintz, Mequon, WI (US)

(73) Assignee: Systems, LLC, Germantown, WI (US)

( * ) Notice: Subject to any disclaimer, the term of this patent is extended or adjusted under 35 U.S.C. 154(b) by 0 days.

(21) Appl. No.: 16/919,239

(22) Filed: Jul. 2, 2020

(65) Prior Publication Data

US 2020/0331714 A1   Oct. 22, 2020

Related U.S. Application Data

(63) Continuation of application No. 15/299,670, filed on Oct. 21, 2016, now Pat. No. 10,781,062.

(60) Provisional application No. 62/346,809, filed on Jun. 7, 2016, provisional application No. 62/259,196, filed on Nov. 24, 2015.

(51) Int. Cl.
 *B65G 69/00* (2006.01)

(52) U.S. Cl.
 CPC .................. *B65G 69/003* (2013.01)

(58) Field of Classification Search
 CPC .................................................. B65G 69/003
 See application file for complete search history.

(56) References Cited

U.S. PATENT DOCUMENTS

| | | |
|---|---|---|
| 2,889,565 A | 6/1959 | Ralph |
| 4,010,571 A | 3/1977 | McGuire |
| 4,207,019 A | 6/1980 | Cone |
| 4,282,621 A | 8/1981 | Anthony |
| 4,364,137 A | 12/1982 | Hahn |
| 4,472,099 A | 9/1984 | Hahn |
| 4,555,211 A | 11/1985 | Metz |

(Continued)

FOREIGN PATENT DOCUMENTS

| | | |
|---|---|---|
| CA | 1114566 | 12/1981 |
| CA | 1273458 | 9/1990 |

(Continued)

OTHER PUBLICATIONS

U.S. Appl. No. 16/022,236, filed Jun. 28, 2018, Schlintz John.

(Continued)

*Primary Examiner* — Saul Rodriguez
*Assistant Examiner* — Ashley K Romano
(74) *Attorney, Agent, or Firm* — Fitch, Even, Tabin & Flannery LLP

(57) ABSTRACT

A vehicle restraint system that includes a carriage and a hook that is moveable relative to the carriage. The hook is moveable between an engaged or extended position wherein the hook interferes with translation of vehicle relative to the vehicle restraint system and a disengaged or retracted position wherein the vehicle can be associated with or removed from interaction with the vehicle restraint system. The hook is secured to the carriage via an eccentric pivot assembly such that translation of the hook relative to the carriage includes an least partially lateral translation of the hook relative to the carriage thereby improving the repeatability associated with operation of the restraint system to securely engage and disengage respective vehicles from the restraint system without independent manipulation of the position of the vehicle relative to the restraint system.

19 Claims, 20 Drawing Sheets

(56) References Cited

U.S. PATENT DOCUMENTS

| | | |
|---|---|---|
| 4,560,315 A | 12/1985 | Hahn |
| 4,630,989 A | 12/1986 | Davey |
| 4,634,334 A | 1/1987 | Hahn |
| 4,648,781 A | 3/1987 | Sikora |
| 4,674,941 A | 6/1987 | Hageman |
| 4,692,755 A | 9/1987 | Hahn |
| 4,695,216 A | 9/1987 | Erlandsson |
| 4,744,121 A | 5/1988 | Swessel |
| 4,759,678 A | 7/1988 | Hageman |
| 4,767,254 A | 8/1988 | Kovach |
| 4,776,052 A | 10/1988 | Delgado |
| 4,815,918 A | 3/1989 | Bennett |
| 4,830,563 A | 5/1989 | Yeakle |
| 4,843,373 A | 6/1989 | Trickle |
| 4,861,217 A | 8/1989 | Erlandsson |
| 4,865,508 A | 9/1989 | Carlson |
| 4,887,954 A | 12/1989 | Gregerson |
| 4,915,568 A | 4/1990 | West |
| 4,920,598 A | 5/1990 | Hahn |
| 4,938,647 A | 7/1990 | Erlandsson |
| 4,938,648 A | 7/1990 | Horan |
| 4,946,330 A * | 8/1990 | Pedersen .............. B65G 69/003 14/71.1 |
| 4,950,118 A | 8/1990 | Mueller |
| 4,963,068 A | 10/1990 | Gelder |
| 4,964,777 A | 10/1990 | Kleynjans |
| 4,973,213 A | 11/1990 | Erlandsson |
| 4,988,254 A | 1/1991 | Alexander |
| 5,026,242 A | 6/1991 | Alexander |
| 5,040,258 A | 8/1991 | Hahn |
| 5,047,748 A | 9/1991 | Trickle |
| 5,071,306 A | 12/1991 | Alexander |
| 5,096,359 A | 3/1992 | Alexander |
| 5,117,526 A | 6/1992 | Alexander |
| 5,120,181 A | 6/1992 | Alexander |
| 5,168,267 A | 12/1992 | Trickle |
| 5,186,267 A | 2/1993 | White |
| 5,212,846 A | 5/1993 | Hahn |
| 5,259,718 A | 11/1993 | Alexander |
| 5,297,921 A | 3/1994 | Springer |
| 5,299,386 A | 4/1994 | Naegelli |
| 5,312,213 A | 5/1994 | Winsor |
| 5,346,353 A | 9/1994 | Alexander |
| 5,348,437 A | 9/1994 | Krupke |
| 5,388,947 A | 2/1995 | Ancel |
| 5,396,676 A | 3/1995 | Alexander |
| 5,449,267 A | 9/1995 | Ablabutyan |
| 5,453,735 A | 9/1995 | Hahn |
| 5,454,682 A | 10/1995 | Alexander |
| 5,459,963 A | 10/1995 | Alexander |
| 5,522,108 A | 6/1996 | Massey |
| 5,564,238 A | 10/1996 | Ellis |
| 5,586,355 A | 12/1996 | Metz |
| 5,683,219 A | 11/1997 | Gilles, Jr. |
| 5,683,221 A | 11/1997 | Ablabutyan |
| 5,702,223 A | 12/1997 | Hahn |
| 5,709,458 A | 1/1998 | Metz |
| 5,762,459 A | 6/1998 | Springer |
| 5,831,540 A | 11/1998 | Sullivan |
| 5,882,167 A | 3/1999 | Hahn |
| 5,964,572 A | 10/1999 | Hahn |
| 6,006,389 A | 12/1999 | Alexander |
| 6,010,297 A | 1/2000 | Hahn |
| 6,033,174 A | 3/2000 | Alexander |
| 6,035,475 A | 3/2000 | Alexander |
| 6,062,796 A | 5/2000 | Alexander |
| 6,065,172 A | 5/2000 | Swessel |
| 6,074,157 A | 6/2000 | Hahn |
| 6,092,970 A | 7/2000 | Hahn |
| 6,106,212 A | 8/2000 | Hahn |
| 6,113,337 A | 9/2000 | Massey |
| 6,116,839 A | 9/2000 | Bender |
| 6,125,491 A | 10/2000 | Alexander |
| 6,139,242 A | 10/2000 | Alexander |
| 6,162,005 A | 12/2000 | Fritz |
| 6,190,108 B1 | 2/2001 | Alexander |
| 6,190,109 B1 | 2/2001 | Bender |
| 6,204,762 B1 | 3/2001 | Dering |
| 6,218,956 B1 | 4/2001 | Davis |
| 6,220,809 B1 | 4/2001 | Hahn |
| 6,232,887 B1 | 5/2001 | Carson |
| 6,236,911 B1 | 5/2001 | Kruger |
| 6,240,587 B1 | 6/2001 | Meichtry et al. |
| 6,279,276 B1 | 8/2001 | Knoll |
| 6,322,310 B1 | 11/2001 | Bender |
| 6,322,311 B1 | 11/2001 | Alexander |
| 6,329,931 B1 | 12/2001 | Gunton |
| RE37,570 E | 3/2002 | Springer et al. |
| 6,360,393 B1 | 3/2002 | Fritz |
| 6,367,941 B2 | 4/2002 | Lea |
| 6,371,714 B1 | 4/2002 | Sherard |
| 6,385,537 B2 | 5/2002 | Gaspard, II |
| 6,405,397 B1 | 6/2002 | Alexander |
| 6,409,452 B1 | 6/2002 | Zibella |
| 6,411,054 B1 | 6/2002 | Van Wiemeersch |
| 6,431,819 B1 | 8/2002 | Hahn |
| 6,437,702 B1 | 8/2002 | Ragland |
| 6,439,823 B1 | 8/2002 | Lambert |
| 6,442,783 B1 | 9/2002 | Yoon |
| 6,476,572 B2 | 11/2002 | Lounsbury |
| 6,490,443 B1 | 12/2002 | Freeny, Jr. |
| 6,502,268 B2 | 1/2003 | Ashelin |
| 6,518,878 B1 | 2/2003 | Skoff |
| 6,524,053 B2 | 2/2003 | Hahn |
| 6,542,856 B2 | 4/2003 | Frantz |
| 6,594,842 B2 | 7/2003 | Alexander |
| 6,634,139 B1 | 10/2003 | Metz |
| 6,687,609 B2 | 2/2004 | Hsiao |
| 6,698,052 B2 | 3/2004 | Stolk |
| 6,726,432 B2 | 4/2004 | Kish |
| 6,763,768 B2 | 7/2004 | Hart |
| 6,773,221 B2 | 8/2004 | Belongia |
| 6,781,516 B2 | 8/2004 | Reynard |
| 6,792,321 B2 | 9/2004 | Sepe, Jr. |
| 6,792,716 B1 | 9/2004 | Luster |
| 6,804,850 B2 | 10/2004 | Alexander |
| 6,812,849 B1 | 11/2004 | Ancel |
| 6,834,409 B2 | 12/2004 | Gleason |
| 6,883,198 B2 | 4/2005 | Alexander |
| 6,918,151 B2 | 7/2005 | Massey |
| 6,931,686 B2 | 8/2005 | Hoofard |
| 6,975,226 B2 | 12/2005 | Reynard |
| 7,013,519 B2 | 3/2006 | Gleason |
| 7,017,643 B2 | 3/2006 | Leum |
| 7,056,077 B2 | 6/2006 | Pedersen |
| 7,062,814 B2 | 6/2006 | Bender |
| 7,119,673 B2 | 10/2006 | Eager |
| 7,134,159 B2 | 11/2006 | Muhl |
| 7,162,762 B1 | 1/2007 | Gleason |
| 7,165,486 B2 | 1/2007 | Alexander |
| 7,181,369 B2 | 2/2007 | Kanki |
| 7,207,370 B2 | 4/2007 | Snyder |
| 7,216,392 B2 | 5/2007 | Hoofard |
| 7,226,265 B2 | 6/2007 | Wilson |
| 7,237,591 B2 | 7/2007 | Snyder |
| 7,256,703 B2 | 8/2007 | Duvernell |
| 7,264,092 B2 | 9/2007 | Gaetan |
| 7,274,300 B2 | 9/2007 | Duvernell |
| 7,337,822 B2 | 3/2008 | Snyder |
| 7,363,670 B2 | 4/2008 | Mitchell |
| 7,380,375 B2 | 6/2008 | Maly |
| 7,384,229 B2 | 6/2008 | Gleason |
| 7,407,584 B2 | 8/2008 | Lemoine |
| 7,546,655 B2 | 6/2009 | Mitchell |
| 7,600,282 B2 | 10/2009 | Grunewald |
| 7,739,834 B2 | 6/2010 | Stoffels |
| 7,752,696 B2 | 7/2010 | Grunewald |
| 7,775,252 B2 | 8/2010 | Snyder |
| 7,823,239 B2 | 11/2010 | Hochstein |
| 7,832,451 B2 | 11/2010 | Miller |
| 7,841,823 B2 | 11/2010 | Sveum |
| 7,956,718 B2 | 6/2011 | Murphy |
| 8,006,811 B2 | 8/2011 | Andersen |

(56) References Cited

U.S. PATENT DOCUMENTS

| | | | |
|---|---|---|---|
| 8,046,857 B2 * | 11/2011 | Whitley | B65G 69/287 277/921 |
| 8,047,751 B2 | 11/2011 | Powers | |
| 8,087,443 B2 | 1/2012 | Snyder | |
| 8,112,949 B2 | 2/2012 | Eungard | |
| 8,136,964 B2 | 3/2012 | Hudson | |
| 8,141,189 B2 | 3/2012 | Mitchell | |
| 8,181,401 B2 | 5/2012 | Eungard | |
| 8,191,194 B2 | 6/2012 | Belongia | |
| 8,245,617 B2 | 8/2012 | Martinez | |
| 8,286,757 B2 | 10/2012 | Nelson | |
| 8,287,223 B2 | 10/2012 | Andersen | |
| 8,303,235 B2 | 11/2012 | Sander | |
| 8,307,956 B2 | 11/2012 | Andersen | |
| 8,308,393 B2 | 11/2012 | Jette | |
| 8,366,301 B2 | 2/2013 | Hudson | |
| 8,407,842 B2 | 4/2013 | Story | |
| 8,453,705 B2 | 6/2013 | Miller | |
| 8,464,384 B2 | 6/2013 | Belongia | |
| 8,464,846 B2 | 6/2013 | Andersen | |
| 8,465,245 B2 | 6/2013 | Manone | |
| 8,490,668 B2 | 7/2013 | Snyder | |
| 8,497,761 B2 | 7/2013 | McNeill | |
| 8,499,897 B2 | 8/2013 | Brooks | |
| 8,529,183 B2 | 9/2013 | Ion | |
| 8,532,816 B2 | 9/2013 | Ion | |
| 8,547,234 B2 | 10/2013 | Maly | |
| 8,590,087 B2 | 11/2013 | Swessel | |
| 8,590,673 B2 | 11/2013 | Andersen | |
| 8,590,674 B2 | 11/2013 | Jette | |
| 8,596,949 B2 | 12/2013 | Harrington | |
| 8,616,826 B2 | 12/2013 | Cotton | |
| 8,627,529 B1 | 1/2014 | Palmersheim | |
| 8,657,551 B2 | 2/2014 | Andersen | |
| 8,662,535 B2 | 3/2014 | Andersen | |
| 8,678,736 B2 | 3/2014 | Andersen | |
| 8,826,963 B2 | 9/2014 | Wiegel | |
| 8,838,279 B2 | 9/2014 | Blackwell | |
| 8,869,948 B2 | 10/2014 | Saliger | |
| 8,905,198 B2 | 12/2014 | Brooks | |
| 8,915,029 B2 | 12/2014 | Digmann | |
| 8,994,496 B2 | 3/2015 | Freese | |
| 9,010,501 B2 | 4/2015 | Brooks | |
| 9,051,136 B2 | 6/2015 | Leum | |
| 9,096,170 B2 | 8/2015 | Swessel | |
| 9,096,397 B2 | 8/2015 | Brooks | |
| 9,126,775 B2 | 9/2015 | Brooks | |
| 9,139,384 B2 | 9/2015 | Brooks, IV | |
| 9,145,273 B2 | 9/2015 | Brooks | |
| 9,150,367 B2 | 10/2015 | Brooks | |
| 9,150,369 B1 | 10/2015 | Leum | |
| 9,174,811 B2 | 11/2015 | Proffitt | |
| 9,227,799 B2 | 1/2016 | Brooks | |
| 9,230,419 B2 | 1/2016 | Beggs | |
| 9,255,699 B2 | 2/2016 | Wiegel | |
| 9,272,854 B2 | 3/2016 | Lessard | |
| 9,273,512 B2 | 3/2016 | Digmann | |
| 9,284,764 B2 | 3/2016 | Hudson | |
| 9,428,349 B2 | 8/2016 | Muhl | |
| 9,481,531 B2 | 11/2016 | Stone | |
| 9,542,824 B2 | 1/2017 | Beggs | |
| 9,547,969 B2 | 1/2017 | Beggs | |
| 9,564,072 B2 | 2/2017 | Senfleben | |
| 9,586,771 B2 | 3/2017 | Brooks | |
| 9,728,020 B2 | 8/2017 | Freese | |
| 9,777,529 B2 | 10/2017 | McNeill | |
| 10,569,978 B2 | 2/2020 | Gleason | |
| 10,906,759 B2 | 2/2021 | Schlintz | |
| 2002/0017127 A1 | 2/2002 | Nakano | |
| 2002/0057204 A1 | 5/2002 | Bligh | |
| 2002/0078639 A1 | 6/2002 | Venegas | |
| 2002/0140390 A1 | 10/2002 | Lounsbury | |
| 2002/0141852 A1 | 10/2002 | Hahn | |
| 2002/0157195 A1 | 10/2002 | Alexander | |
| 2003/0023333 A1 | 1/2003 | Birkle | |
| 2003/0151912 A1 | 8/2003 | Ancel | |
| 2003/0197622 A1 | 10/2003 | Reynard | |
| 2003/0199996 A1 | 10/2003 | Reynard | |
| 2003/0204921 A1 | 11/2003 | Bender | |
| 2003/0213073 A1 | 11/2003 | Alexander | |
| 2003/0226494 A1 | 12/2003 | Sunaga | |
| 2004/0004547 A1 | 1/2004 | Appelt | |
| 2004/0005210 A1 | 1/2004 | Alexander | |
| 2004/0062628 A1 | 4/2004 | Alexander | |
| 2004/0117927 A1 | 6/2004 | Gleason | |
| 2004/0118314 A1 | 6/2004 | Hart | |
| 2004/0231806 A1 | 11/2004 | Leum | |
| 2005/0001728 A1 | 1/2005 | Appelt | |
| 2005/0046562 A1 | 3/2005 | Stigall | |
| 2005/0091766 A1 | 5/2005 | Gleason | |
| 2005/0102041 A1 | 5/2005 | Duvernell | |
| 2005/0102042 A1 | 5/2005 | Reynard | |
| 2005/0150952 A1 | 7/2005 | Chung | |
| 2005/0168999 A1 | 8/2005 | Sommers | |
| 2005/0196255 A1 | 9/2005 | Sveum | |
| 2005/0254249 A1 | 11/2005 | Robbins, III | |
| 2005/0261786 A1 | 11/2005 | Eager | |
| 2006/0051196 A1 | 3/2006 | McDonald | |
| 2006/0091297 A1 | 5/2006 | Anderson | |
| 2006/0097857 A1 | 5/2006 | Osaka | |
| 2006/0132284 A1 | 6/2006 | Murphy | |
| 2006/0137261 A1 | 6/2006 | Maly | |
| 2006/0181391 A1 | 8/2006 | McNeill | |
| 2006/0182559 A1 | 8/2006 | Gleason | |
| 2006/0254003 A1 | 11/2006 | Grunewald | |
| 2006/0266275 A1 | 11/2006 | Dibiase | |
| 2007/0031124 A1 | 2/2007 | Kim | |
| 2007/0248440 A1 | 10/2007 | Andersen | |
| 2008/0000156 A1 | 1/2008 | Stoffels | |
| 2008/0010748 A1 | 1/2008 | Menkedick | |
| 2008/0042865 A1 | 2/2008 | Shephard | |
| 2008/0095598 A1 | 4/2008 | Cotton | |
| 2008/0124203 A1 | 5/2008 | McDonald | |
| 2008/0127435 A1 | 6/2008 | Maly | |
| 2009/0155030 A1 | 6/2009 | Andersen | |
| 2010/0114405 A1 | 5/2010 | Elston | |
| 2010/0146719 A1 | 6/2010 | Swessel | |
| 2010/0170754 A1 | 7/2010 | Brooks | |
| 2010/0263281 A1 | 10/2010 | Stoffels | |
| 2010/0263803 A1 | 10/2010 | Kniese | |
| 2010/0266375 A1 | 10/2010 | Ion | |
| 2010/0269273 A1 | 10/2010 | Proffitt | |
| 2011/0006917 A1 | 1/2011 | Taniguchi | |
| 2011/0075441 A1 | 3/2011 | Swessel | |
| 2011/0203059 A1 | 8/2011 | Whitley | |
| 2011/0222962 A1 | 9/2011 | Jette | |
| 2011/0234367 A1 | 9/2011 | Murphy | |
| 2011/0238231 A1 | 9/2011 | Blackwell | |
| 2011/0240416 A1 | 10/2011 | Brooks | |
| 2011/0258788 A1 | 10/2011 | Ion | |
| 2011/0290596 A1 | 12/2011 | Perkins | |
| 2012/0011774 A1 | 1/2012 | Arnaud | |
| 2012/0025964 A1 | 2/2012 | Beggs | |
| 2012/0131755 A1 | 5/2012 | Luu | |
| 2013/0017045 A1 | 1/2013 | Brooks | |
| 2013/0291455 A1 | 11/2013 | Wiegel | |
| 2013/0292214 A1 | 11/2013 | Brooks | |
| 2013/0332217 A1 | 12/2013 | McNeill | |
| 2014/0062691 A1 | 3/2014 | Graham | |
| 2014/0064891 A1 | 3/2014 | Brooks | |
| 2014/0064892 A1 | 3/2014 | Proffitt | |
| 2014/0071661 A1 | 3/2014 | Zealer | |
| 2014/0075842 A1 | 3/2014 | McNeill | |
| 2014/0225509 A1 | 8/2014 | Wiegel | |
| 2014/0255134 A1 | 9/2014 | Brooks, IV | |
| 2015/0009046 A1 | 1/2015 | Senfleben | |
| 2015/0013083 A1 | 1/2015 | Palmersheim | |
| 2015/0047132 A1 | 2/2015 | Sveum | |
| 2015/0052833 A1 | 2/2015 | Digmann | |
| 2015/0127222 A1 | 5/2015 | Cunningham, III | |
| 2015/0138002 A1 | 5/2015 | Beggs | |
| 2015/0145661 A1 | 5/2015 | Beggs | |
| 2015/0145700 A1 | 5/2015 | Beggs | |
| 2015/0145701 A1 | 5/2015 | Beggs | |

(56) References Cited

U.S. PATENT DOCUMENTS

| | | |
|---|---|---|
| 2015/0158428 A1 | 6/2015 | Beggs |
| 2015/0170493 A1 | 6/2015 | Beggs |
| 2015/0170498 A1 | 6/2015 | Beggs |
| 2015/0191319 A1 | 7/2015 | Muhl |
| 2015/0210487 A1 | 7/2015 | Brooks |
| 2015/0217951 A1 | 8/2015 | Lessard |
| 2015/0239686 A1 | 8/2015 | Stone |
| 2015/0375947 A1 | 12/2015 | Hochstein |
| 2016/0009177 A1 | 1/2016 | Brooks |
| 2016/0075526 A1 | 3/2016 | Avalos |
| 2016/0104364 A1 | 4/2016 | Brooks |
| 2016/0311635 A1 | 10/2016 | Stone |
| 2016/0369876 A1 | 12/2016 | Muhl |
| 2017/0008711 A1 | 1/2017 | Stone |
| 2017/0043967 A1 | 2/2017 | Walford |
| 2017/0044817 A1 | 2/2017 | McNeill |
| 2017/0045400 A1 | 2/2017 | Stone |
| 2017/0066607 A1 | 3/2017 | Muhl |
| 2017/0137239 A1 | 5/2017 | Kimener |
| 2017/0144847 A1 | 5/2017 | Gadbois |
| 2017/0320685 A1 | 11/2017 | Hoofard |
| 2019/0009999 A1 | 1/2019 | Schlintz |
| 2019/0119055 A1 | 4/2019 | Schlintz |
| 2019/0263607 A1* | 8/2019 | Mushynski ............ B65G 67/54 |

FOREIGN PATENT DOCUMENTS

| | | |
|---|---|---|
| CA | 1313439 | 2/1993 |
| CA | 2138890 | 6/1995 |
| CA | 2272808 | 12/1999 |
| CA | 2348289 | 5/2000 |
| CA | 2344537 | 10/2001 |
| CA | 2484931 | 11/2003 |
| CA | 2536978 | 3/2005 |
| CA | 2561113 | 10/2005 |
| CA | 2657374 | 1/2008 |
| CA | 2691426 | 1/2009 |
| CA | 2691487 | 1/2009 |
| CA | 2778804 | 1/2009 |
| CA | 2638717 | 2/2009 |
| CA | 2705359 | 6/2009 |
| CA | 2744950 | 7/2010 |
| CA | 2657744 | 9/2010 |
| CA | 2700816 | 9/2010 |
| CA | 2699135 | 10/2010 |
| CA | 2732333 | 8/2011 |
| CA | 2737723 | 10/2011 |
| CA | 2806320 | 2/2012 |
| CA | 2877984 | 7/2015 |
| CN | 1956669 | 5/2007 |
| CN | 101076838 | 11/2007 |
| CN | 101688424 | 3/2010 |
| CN | 101839110 | 9/2010 |
| CN | 103382754 | 11/2013 |
| DE | 68909886 | 5/1994 |
| DE | 60312316 | 11/2007 |
| EP | 0012386 | 6/1980 |
| EP | 0366887 | 5/1990 |
| EP | 369106 | 5/1990 |
| EP | 1478817 | 8/2003 |
| EP | 1498548 | 1/2005 |
| EP | 1501753 | 2/2005 |
| EP | 1594783 | 11/2005 |
| EP | 1732418 | 12/2006 |
| EP | 1764322 | 3/2007 |
| EP | 1825447 | 8/2007 |
| EP | 1836541 | 9/2007 |
| EP | 2041007 | 4/2009 |
| EP | 2176489 | 4/2010 |
| EP | 2215612 | 8/2010 |
| EP | 18525447 | 7/2011 |
| EP | 2380834 | 10/2011 |
| EP | 2598376 | 6/2013 |
| EP | 2660170 | 11/2013 |
| EP | 2840564 | 2/2015 |
| EP | 2886497 | 6/2015 |
| EP | 2902347 | 8/2015 |
| WO | 1990011561 | 10/1990 |
| WO | 1999035067 | 7/1999 |
| WO | 2000024658 | 5/2000 |
| WO | 0063613 | 10/2000 |
| WO | 03067000 | 8/2003 |
| WO | 2003093150 | 11/2003 |
| WO | 2004069703 | 8/2004 |
| WO | 2005095848 | 10/2005 |
| WO | 2006066013 | 6/2006 |
| WO | 2006091900 | 8/2006 |
| WO | 2008008698 | 1/2008 |
| WO | 2009005931 | 1/2009 |
| WO | 2009070509 | 6/2009 |
| WO | 2010077977 | 7/2010 |
| WO | 2012009647 | 1/2012 |
| WO | 2012015752 | 2/2012 |
| WO | 2014116975 | 7/2014 |
| WO | 2015084167 | 6/2015 |
| WO | 2015166339 | 11/2015 |
| WO | 2016007321 | 1/2016 |
| WO | 2016044327 | 3/2016 |

OTHER PUBLICATIONS

U.S. Appl. No. 16/228,268, filed Dec. 20, 2018, Schlintz John.
U.S. Final Office Action dated Oct. 2, 2019, U.S. Appl. No. 15/299,670.
U.S. Non-Final Office Action dated Mar. 29, 2019, U.S. Appl. No. 15/299,670, 9 pages.
U.S. Non-Final Office Action dated Nov. 27, 2019; U.S. Appl. No. 16/022,236.
U.S. Office Action dated Mar. 3, 2020, U.S. Appl. No. 16/228,268, 66 pages.
U.S. Appl. No. 16/022,236, filed Jun. 28, 2018 entitled "Dock Restraint Hook and Control Systems."
U.S. Appl. No. 15/299,670; Notice of Allowance dated Apr. 13, 2020; (pp. 1-9).
U.S. Appl. No. 16/022,236; Notice of Allowance dated May 4, 2020, (pp. 1-7).
U.S. Appl. No. 16/228,268; Notice of Allowance dated Sep. 2, 2020, (pp. 1-7).

* cited by examiner

US 11,465,865 B2

VEHICLE RESTRAINT SYSTEM

CROSS REFERENCE TO RELATED APPLICATIONS

This is a continuation of U.S. patent application Ser. No. 15/299,670, Filed Oct. 21, 2016, entitled "DOCK RESTRAINT WITH DYNAMIC OFFSET HOOK ASSEMBLY," which issued as U.S. Pat. No. 10,781,062 on Sep. 22, 2020, which application claims priority to U.S. Provisional Patent Application No. 62/346,809 filed on Jun. 7, 2016 and U.S. Provisional Patent Application No. 62/259,196 filed on Nov. 24, 2015, both entitled "DOCK RESTRAINT WITH DYNAMIC OFFSET HOOK ASSEMBLY" and the disclosures of all being incorporated herein.

BACKGROUND OF THE INVENTION

The present invention relates to dock restraint systems used to secure vehicles, such as semitrailers, proximate a loading dock. More specifically, the present invention relates to a hook assembly used with dock restraint systems to more readily facilitate disengagement of the hook from a secured vehicle.

Vehicle restraint systems are commonly used to secure a vehicle, such as a semitrailer relative to a loading dock. When engaged, such restraint systems prevent translation of the vehicle relative to the loading dock and/or a dock plate. As commonly understood by those skilled in the art, a dock plate is a ramp or the like that provides a transition from dock areas to the load space associated with the vehicle. Preferably, the vehicle is secured such that the bed of the vehicle's storage area can be conveniently accessed by personnel and/or equipment associated with loading and unloading operations while the position of the vehicle is maintained relative to the dock or dock area. This allows the contents of the storage area to be quickly and efficiently exchanged between the facility and over the road transport vehicles without fear of the formation of a gap between the dock and the vehicle and/or the load area or bed of the transport vehicle. U.S. Pat. No. 6,190,109, which is incorporated herein by reference, discloses one such dock plate or leveler and a dock restraint system associated therewith.

In many dock restraint systems, the vehicle restraint device or system includes a carriage that is adjustably mounted to a mounting plate connected to a wall adjacent to the dock. The carriage is commonly configured to slideably cooperate with the underside of an underride or rear impact guard that is associated with the frame of the load vehicle. Commonly, the restraining member is pivotably supported by the carriage such that the restraint can be selectively engaged and disengaged from interaction with the rear impact guard.

Translation of the vehicle during loading and unloading operations can result in "jamming" of the restraining member and/or undesired interference of the restraining member with the vehicle guard. This undesired interference or "jamming" of the restraint system with the underlying vehicle can result in the inability to engage or disengage the restraining member from interaction with the vehicle guard when desired. Generally, the inability to achieve the desired engagement or disengagement of the restraining member or dock hook from the vehicle must be resolved by physically moving the vehicle relative to the carriage and/or restraint to effectuate the desired engagement and/or disengagement of the restraining member from the vehicle or trailer associated with the loading dock. Such undesired interaction proves problematic when trailers are left in a loading dock without an associated power vehicle such as a tug, tractor, or semi-tractor or operators or drivers are unavailable to operate the vehicle being loaded.

Accordingly, there is a need for a vehicle restraint system which can be selectively engaged and disengaged from discrete vehicles having various vehicle frame configurations. There is a further need for a vehicle restraint system that resists translation of a secured vehicle and remains operable to disengage from the underlying vehicle after loading of the vehicle and without subsequent translation of the vehicle relative to the securing system. There is a further need for a vehicle restraint system that can operatively cooperate with vehicle frame members, such as rear impact guards (RIG) having different configurations, such as tube members having exposed edge surfaces or more plate or planar shaped forward facing engagement surfaces to selectively engage and restrain movement of the vehicle relative to the restraint system without interfering with or impeding the desired selective disengagement of the respective vehicle from the restraint system.

BRIEF DESCRIPTION OF THE INVENTION

The present invention discloses a vehicle securing system that overcomes one or more of the drawbacks disclosed above. One aspect of the invention discloses a vehicle restraint assembly that includes a restraining member having a base, a crown, an offset shank, and a pivot hole. The crown includes a tooth that engages a portion of a parked vehicle such as a vehicle guard. Consistent with prior systems, the hook rotates in a generally upward direction until it engages a vehicle frame member or guard. Unlike prior art vehicle restraint systems, the restraint or hook translates relative to a carriage that supports the hook in an at least partly lateral direction relative to the vehicle prior to rotational translation of the hook to a position out of interference with the vehicle guard. Such operation allows the hook to more readily disengage from the vehicle if the vehicle has moved or shifted during loading or unloading operations in a manner that more tightly engages the hook with the vehicle guard.

In another aspect, the vehicle restraint system provides lateral translation of the hook relative to the vehicle after rotation of the hook into interference with the travel path of the vehicle during securing operations. In a preferred aspect, an eccentric mounting arrangement is provided that facilitates the desired lateral and rotational movements of the hook relative to the vehicle and/or a carriage associate with the restraint system during docking and disembarking activities. In another preferred aspect, the restraint assembly includes a catch assembly that is disposed between the hook and a carriage or portion of the assembly associated with supporting the hook. The catch assembly preferably includes a catch body that is movably connected to one of the hook and the restraint and is oriented to cooperate with one or more stops that interfere with the catch body and selectively limit motion of the hook relative to the carriage.

Another aspect of the invention discloses a vehicle restraint system for securing a parked vehicle relative to a loading dock. The vehicle restraint system includes carriage that is mountable adjacent to the loading dock and moveable in a generally vertical direction relative thereto. The carriage includes a recess that is constructed to receive a restraining member that is rotatable relative to the carriage and movable between an extended position wherein the restraining member interferes with a vehicle structure and a retracted position. An eccentric mount arrangement is disposed between the carriage and the restraining member and is configured such that rotation of the eccentric mount arrangement in a first range provides lateral translation of the restraining member relative to the carriage and rotation of the eccentric mount arrangement in a second range provides rotational translation of the restraining member relative to the carriage. The lateral translation of the restraining member accommodates engagement and disengagement of the restraining member from the vehicle in a manner that mitigates "jamming" of the restraint system.

A further aspect of the invention discloses a restraining assembly for use with a vehicle restraint for releasably securing a vehicle to an adjacent structure. The restraint assembly includes a carriage that is mountable to the adjacent structure for vertical movement of the carriage relative thereto. The restraining assembly is mountable to the carriage for pivotal movement of the restraining assembly between a retracted position and an extended position wherein, when in the extended position, the restraining member interferes with translation of a vehicle relative to the restraining assembly. The restraining assembly includes a hook body and an insert associated with the hook body. The insert defines a pivot hole that is offset from a center of the insert such that the insert rotates about an axis that is laterally offset from an axis of rotation of the hook body.

Another aspect of the invention useable or combinable with one or more of the features or aspects disclosed above discloses a restraining member for use with a vehicle restraint for securing a vehicle in a position adjacent a dock structure. The vehicle restraint includes a carriage that is mountable adjacent to a dock structure and is adapted for substantially vertical movement relative thereto. The restraining member includes a crown and a shank coupled to the crown and having a longitudinal axis such that the crown and the shank together define an engagement portion of the restraining member that is adapted to engage a portion of the vehicle. The restraining member includes a base that is coupled to the shank and an insert that extends through an opening in the base. A pivot hole extends through the insert and a pivot shaft extends through the pivot hole and is connected to the carriage. The pivot shaft is configured to cause a rotational and translational movement of the engagement portion of the restraining member to mitigate instances of inoperability of desired movement of the restraining member relative to the carriage.

Another aspect of the invention discloses a dock restraint system that includes a carriage that is configured to cooperate with a vehicle guard. A hook is supported by the carriage and is movable relative thereto. A mount arrangement is disposed between the hook and the carriage and is configured to laterally translate the hook relative to the carriage prior to rotation of the hook relative to the vehicle guard upon rotation of the mount arrangement in either of a clockwise rotational direction and a counterclockwise rotational direction.

A further aspect of the invention discloses a method of securing a vehicle relative to a dock. The method includes at least one of rotating a hook prior to laterally translating the hook relative to a carriage during securing of a vehicle relative to the dock and laterally translating the hook prior to rotating the hook relative to the carriage during disengagement of the vehicle from the carriage.

A further aspect of the invention discloses a vehicle restraint system that includes a carriage that is attached to a support rail such that the carriage is movable in a generally vertical direction relative to the support rail. A hook is secured to the carriage such that the hook is rotatable about an eccentric pivot. A latch is pivotably attached to one of the hook and the carriage and a catch is attached to the other of the hook and the carriage. The catch is oriented to interfere with the latch to prevent rotation of the hook in one direction when the latch is engaged with the catch and allow the latch to bypass the catch when the catch rotates in an opposite direction.

Another aspect of the invention discloses a method of controlling motion of a hook relative to a carriage of a vehicle restraint system. The method includes rotating a hook about an eccentric pivot such that a portion of the hook extends beyond the carriage and a latch rotates in the same direction as the hook past a stop. Rotation of the latch in an opposite direction relative to hook once the latch bypasses the stop allows the portion of the latch that interferes with the stop to prevent rotation of the hook in an opposite direction. Translation of the hook in a generally lateral direction relative to the carriage during rotation of the eccentric pivot allows the latch to bypass the stop upon rotation of the latch. Such a construction allows the latch and stop to cooperate with one another in a manner that prevents unactuated translation of the hook relative to the carriage and undesired separation of a vehicle from the vehicle restraint system. Such a construction also isolates the drive system components associated with the desired translation of the hook relative to the carriage and the underlying vehicle from the forces associated with loading and unloading of the vehicle.

These and other aspects, features, and advantages of the present invention will be made apparent from the following detailed description and the drawings.

BRIEF DESCRIPTION OF THE DRAWINGS

The drawings illustrate various views of restraint systems and alternate embodiments of hook assemblies associated with a vehicle dock restraints or restraint systems presently contemplated for carrying out the invention.

In the drawings.

DETAILED DESCRIPTION OF THE PREFERRED EMBODIMENTS

Figure 1:
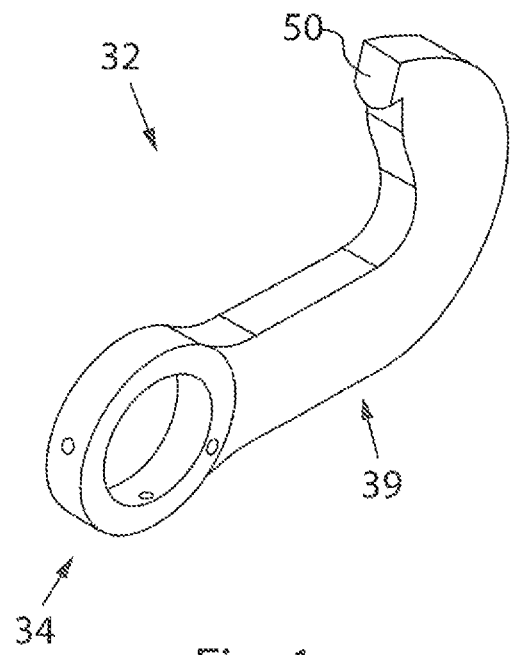
FIG. 1 is a perspective view of a vehicle restraint hook or simply restraint according to one embodiment of the invention.
Figure 2:
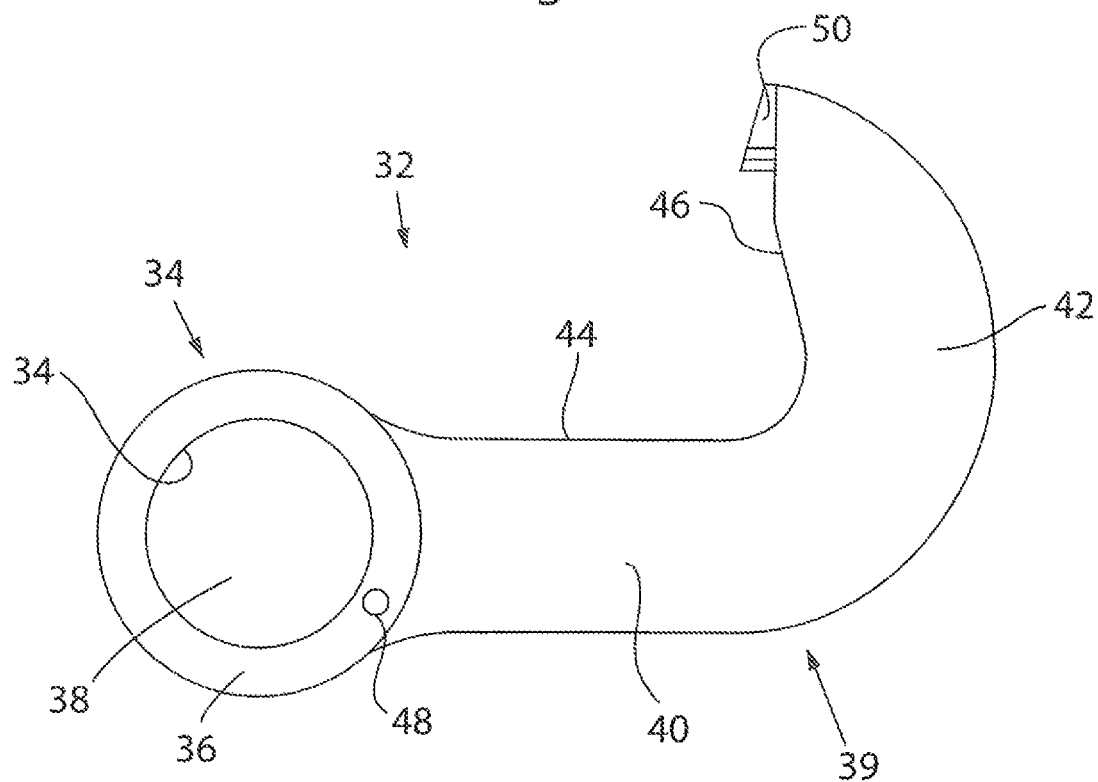
FIG. 2 is a plan view of the restraint shown in FIG. 1.

FIGS. 1 and 2 show a restraint or hook 32 that forms a portion of a vehicle restraining or vehicle restraint system 100 (FIG. 15) according to a first embodiment of the present invention. As disclosed further below with respect to FIGS. 3-14, a hook assembly 30 includes hook 32 that is constructed to cooperate with a cam or an insert 60 and a cover 80 such that hook assembly 30 can be secured to a carriage associated with vehicle restraint system 100 such that hook 32 is movable between an engaged position and a retracted position. When in an "engaged" position, hook assembly 30 interacts with a vehicle frame member, such as an underride guard or the like, such that the vehicle is restrained relative to the restraint system 100, and adjacent structure such as a loading dock area, dock plate, or the like, to facilitate secure interaction with the vehicle being loaded and/or unloaded. When "disengaged" or retracted, vehicles can be readily associated with or removed from restraint system 100.

Referring to FIGS. 1 and 2, hook 32 includes a generally circular base portion 34, a body 39, and a tooth 50 disposed at a distal end thereof generally opposite the generally circular base portion 34. The generally circular base portion 34 comprises an outer rim 36 with an opening 38 located therein. As disclosed further below, opening 38 is constructed to cooperate with an insert that is constructed to accommodate rotational securing of hook 32 relative to a carriage associated with the vehicle restraint system 100. The circular base portion 34 may include a dowel pin opening 48 that extends through outer rim 36. Body 39 of hook 32 extends from the outer rim 36 initially laterally into a shank 40 before turning at a generally 90 degree angle into a crown 42. Shank 40 of body 39 has an upper surface 44 and crown 42 has a side surface 46. Both upper surface 44 of shank 40 and side surface 46 of crown 42 are configured to preferably contact a portion of a vehicle or underride guard 92 as described below. As disclosed further below, in some vehicle configuration, a distal face 93 of tooth 50 may contact the structure of an underlying vehicle and effectuate the securing operation associated with the "engaged" orientation of hook 32. As shown in FIGS. 1 and 2, tooth 50 extends generally perpendicular to crown 42 of hook 32 at the edge of the crown 42 that is generally opposite the bend.

As disclosed further below, for those vehicles having generally open underride guard constructions, tooth 50 defines a lip 95 that engages a top-facing portion of the vehicle or vehicle guard 92 when the hook assembly 30 is in use. When used with vehicles having more closed or panel shaped underride guard constructions, face 93 of tooth 50 may engage the vehicle facing side of such frame structures and the cooperation of hook 32 with the underlying carriage provides a secure interaction between hook 32 and the vehicle underride guard structure as disclosed further below with respect to FIGS. 24 and 25.

Referring back to FIGS. 3-5, an insert 60 is configured to cooperate with opening 38 defined by body 39 of hook 32. Insert 60 includes a base 62 that is generally flat and a shaft 64 that extends in a crossing direction away from base 62. Base 62 and shaft 64 of insert 60 are generally concentric with respect to one another with shaft 64 having a smaller diameter than base 62. Such a construction defines a shoulder 66 that is formed by the outward radial extension of base 62 beyond a radially oriented exterior surface of shaft 64. A diameter of shaft 64 is slightly smaller than a diameter of opening 38 associated with outer rim 36 of hook 32 such that shaft 64 may be inserted into opening 38. A height of the shaft 64 is preferably substantially similar to the width of opening 38. Preferably, the diameter of shaft 64 is dimensioned within machine operation and assembly tolerances associated with the axially slideable interaction between shaft 64 and hook 32 during assembly of hook assembly 30.

Figure 3:
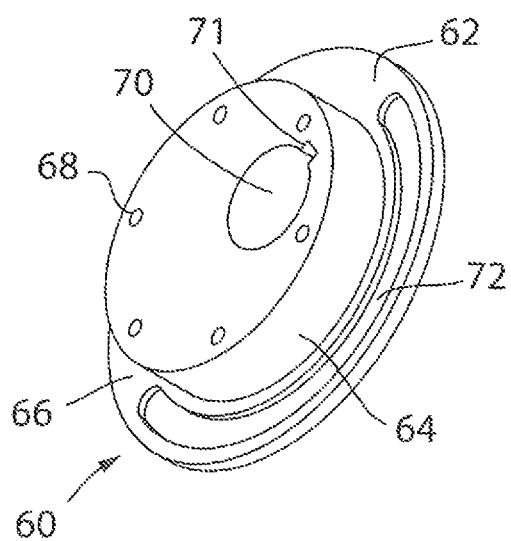
FIG. 3 is a perspective view of an insert that is constructed to cooperate with the restraint shown in FIG. 1.
Figure 5:
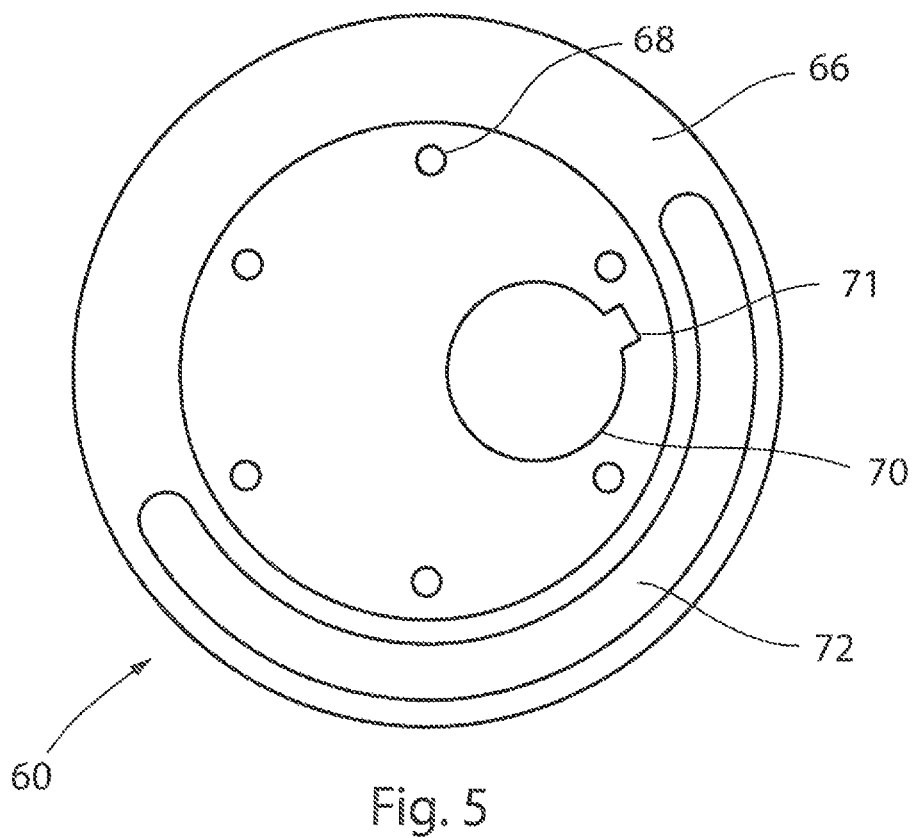
FIG. 5 is a lateral side elevation view of the insert shown in FIG. 3.

As shown in FIGS. 3 and 5, insert 60 has a number of openings. First, a series of blind holes or fastener openings 68 are formed an end face of shaft 64 and are configured to receive screws, bolts, pins, or other attachment devices associated with securing cover 80 to insert 60 such that outer rim 36 of hook 32 is captured between shoulder 66 associated with base 62 and cover 80 when hook assembly 30 is assembled. Insert 60 preferably includes an insert pivot opening or pivot hole 70 that extends through the height of insert 60 including base 62 and shaft 64. Insert pivot hole 70 is generally circular with a key, keyhole 71, or other means to prevent relative rotation between a mating shaft and pivot hole 70. As disclosed further below, insert pivot hole 70 is configured to receive a driving member or drive shaft 143 (FIG. 16) associated with facilitating the desired rotation of insert 60, cover 80, and hook 32 during rotation of the drive shaft. As shown in FIG. 5, insert pivot hole 70 is offset from the center of the insert 60. That is, insert pivot hole 70 is eccentric relative to the center axis of insert 60 and is thereby eccentrically oriented relative to hook 32. As disclosed further below, the eccentric orientation of the drive member relative to hook 32 provides lateral translation of hook 32 relative to an underlying carriage during selected portions of the range of travel associated with operation of hook 32.

Figure 4:
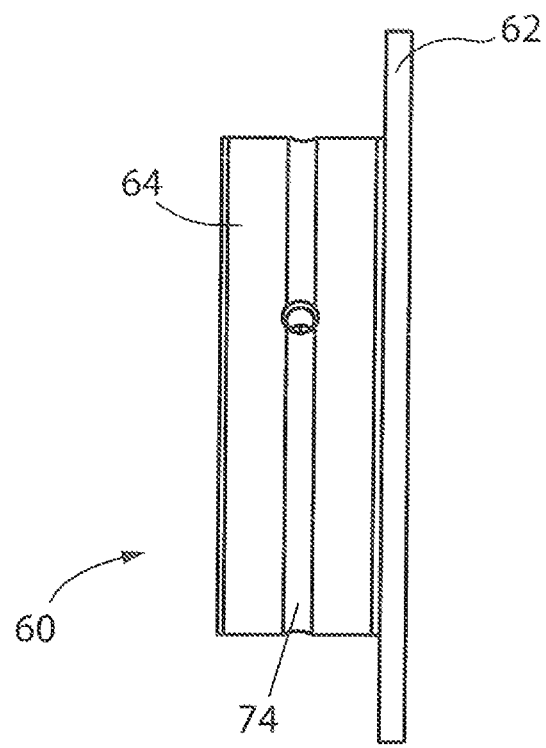
FIG. 4 is a side elevation view of the insert shown in FIG. 3.

Base 62 of insert 60 additionally has a groove or slot 72 that is formed in shoulder 66. As shown, slot 72 extends at least approximately halfway around a circumference of insert 60, more preferably greater than 180 degrees, and more preferably approximately 210 degrees of the circumference of insert 60. Preferably, as disclosed further below, the rotational association between insert 60 and hook 32 allows relative rotation therebetween to achieve an over-center orientation between the axis of rotation associated with pivot hole 70 associated with insert 60 and the axis of rotation associated with hook 32 such that hook 32 can resist rotation of hook 32 relative to insert 60 in response to lateral forces imparted to crown 42 of hook 32 when hook 32 is engaged with a vehicle during vehicle loading and unloading operations. Slot 72 is preferably located directly adjacent outer rim 36 of hook 32 when shaft 64 of insert 60 is associated with opening 38 of hook 32. As shown in FIG. 4, a groove 74 is formed in shaft 64 and extends in a generally circumferential direction about a radially exterior surface of shaft 64. Groove 74 is constructed to accommodate the communication of lubrication or dispersal of grease or the like along the interface between shaft 64 of insert 60 and inner wall 37 of outer rim 36 of hook 32. As described below, such a construction allows insert 60 to rotate relative to the outer rim 36 of hook 32 with reduced frictional interaction, damage, degradation, or wear between the movable relative surfaces of insert 60 and hook 32.

Figure 6:
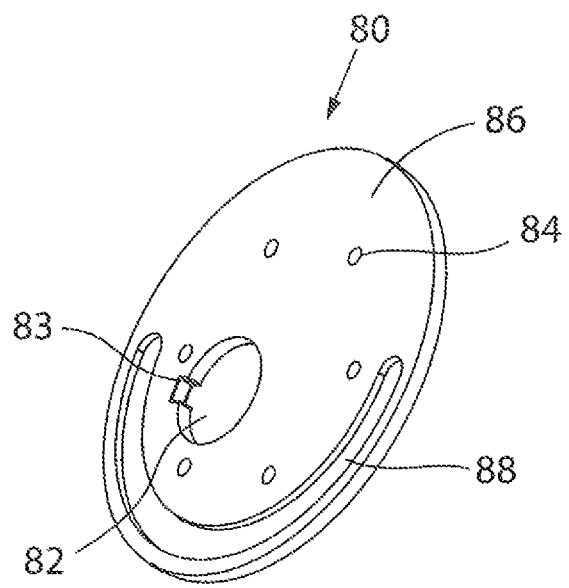
FIG. 6 is a perspective side view of a cover constructed to cooperate with the restraint and the insert shown in FIGS. 1 and 3.
Figure 7:
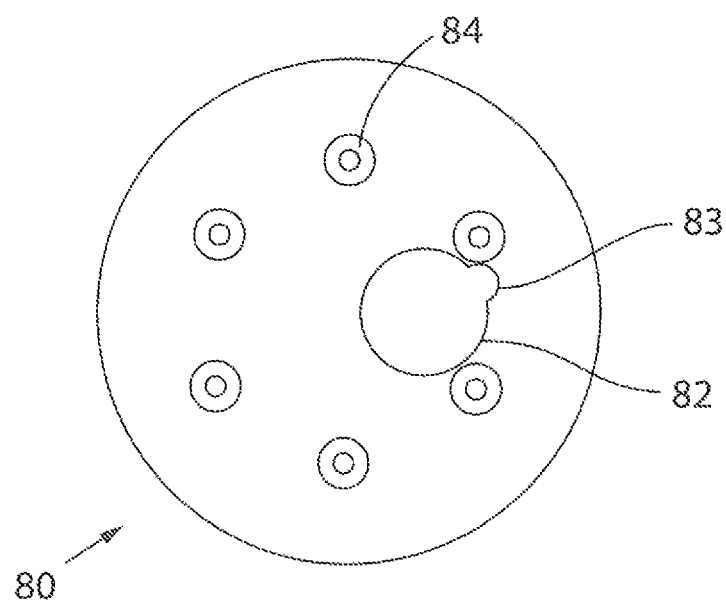
FIG. 7 is a laterally outboard side elevation view of the cover shown in FIG. 6.

FIGS. 6-7 show a cover 80 that is constructed to cooperate with hook 32 and insert 60 at an opposite lateral side of hook assembly 30. As used herein, the opposite lateral sides of hook assembly 30 are those sides that face in generally opposite lateral directions and are oriented normal to the axis of rotation defined by the curvilinear surfaces of shaft 64 and insert pivot hole 70. Cover 80 has a number of features that generally mirror or are complimentary to the features of insert 60. For instance, cover 80 has a cover pivot hole 82 that extends through cover 80. Cover pivot hole 82 is offset or eccentric from the center of the cover 80, is generally circular, and also includes a keyway, keyhole or other means to prevent the mating or drive shaft from rotating within cover pivot hole 83. Cover 80 includes a series of fastener holes 84 that extend through cover 80 and correspond to holes or openings 68 associated with insert 60. Finally, a laterally inboard facing side or underside 86 of cover 80 features a groove or slot 88 that extends approximately at least halfway around a circumference the cover 80, approximately greater than 180 degrees, and more preferably approximately 210 degrees of the circumference of cover 80.

Figure 8:
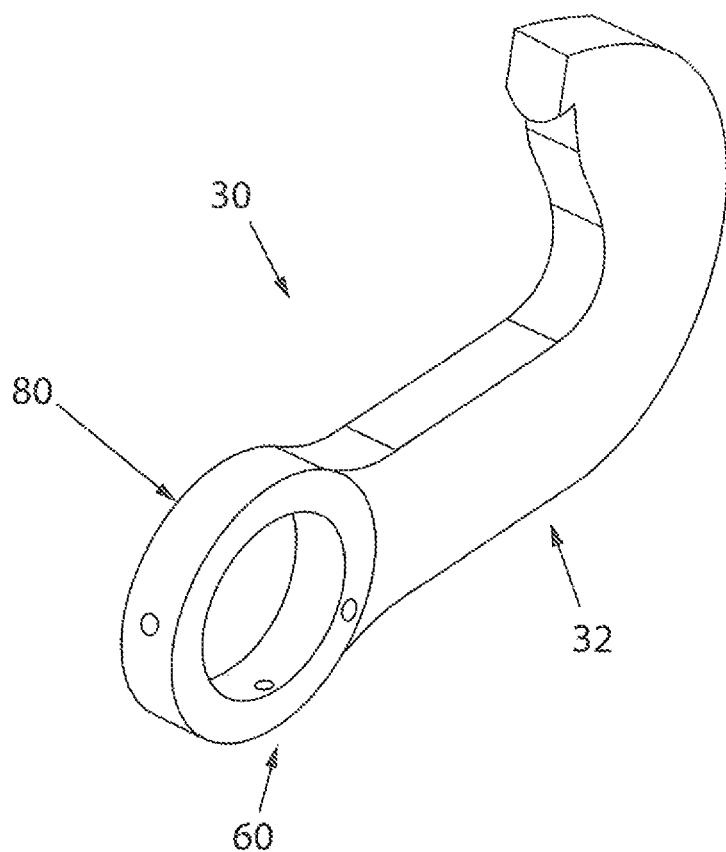
FIG. 8 is a perspective view of the restraint shown in FIG. 1 with the insert shown in FIG. 3 and the cover shown in FIG. 6 associated therewith.

During assembly of the restraint hook assembly 30 associated with hook 32, insert 60, and cover 80; shaft 64 of insert 60 is inserted into opening 38 of hook 32. Shaft 64 is inserted into hook 32 until shoulder 66 of base 62 is adjacent to, abuts, or impinges upon outer rim 36 of hook 32. During assembly, insert pivot hole 70 is then aligned with cover pivot hole 82. One or more fasteners, such as screws, bolts, or other attachment devices are then inserted into the fastener holes 84 of cover 80 and into operative engagement with fastener openings 68 associated with insert 60. Thereafter, outer rim 36 of hook 32 is located or captured between insert 60 and cover 80, as shown in FIG. 8.

Once assembled, hook assembly 30 can be slideably associated with a drive or pivot shaft (FIG. 18) associated with the vehicle restraint system as the drive shaft extends through the insert pivot hole 70 and the cover pivot hole 82 and can be keyed relative thereto. As disclosed further below, rotational operation of the drive shaft effectuates selective translation of the hook assembly 30 relative to the underlying carriage assembly and facilitates selective interaction of hook 32 with a vehicle associated with vehicle restraint system 100. The eccentric association of hook 32 with pivot hole 70 associated with insert 60 allows hook assembly 30 to translate in an eccentric rotational manner about a pivot axis defined by the pivot shaft. Additionally, as insert 60 and cover 80 are connected to but physically separate from hook 32, insert 60 and cover 80 can additionally eccentrically rotate relative to outer rim 36 of hook 32. The rotational movement of insert 60 and cover 80 relative to hook 32 can be limited as disclosed further below.

Figure 9:
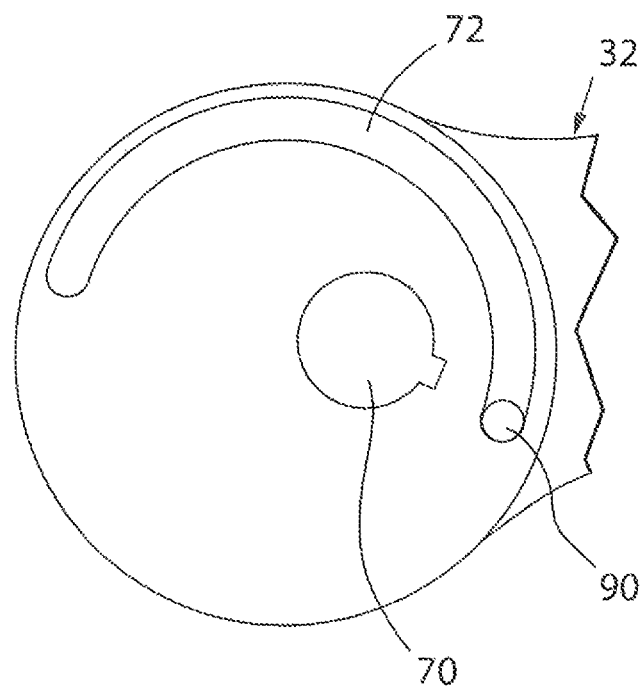
FIG. 9 is an elevation section view of a portion of the restraint and insert taken along line 9-9 shown in FIG. 8.
Figure 11:
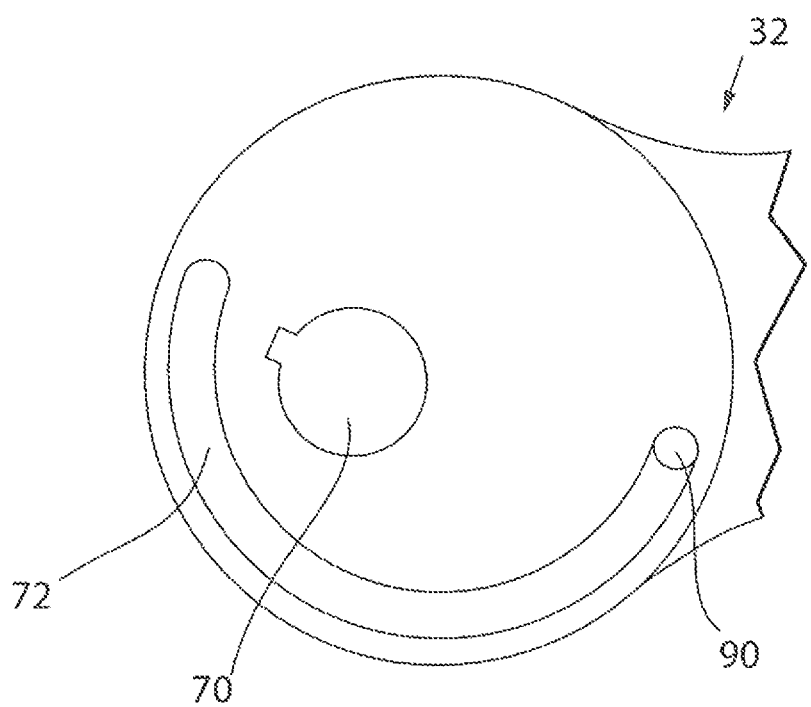
FIG. 11 is a view similar to FIG. 9 with the insert in a second orientation relative to the restraint.

Referring to FIGS. 1, 9, and 11, hook assembly 30 preferably includes a dowel pin 90 that passes through dowel pin opening 48 of hook 32. The generally opposite longitudinal ends of pin 90 slideably cooperate with slot 72 associated with laterally inboard facing side of insert 60 and slot 88 associated the laterally inboard facing side of cover 80. That is, dowel pin 90 has a longitudinal length that is slightly longer than a lateral width of outer rim 36 of body 39 of hook 32. Consequently, dowel pin 90 protrudes into both insert slot 72 and the cover slot 88. Such cooperation allows insert 60 and cover 80 to rotate relative to circular base portion 34 along the length of the slots 72, 88. Put another way, the cooperation of pin 90 with slots 72, 88 limits the degree of relative rotation between hook 32 and insert 60.

Although shown as being oriented radially inboard relative to an outer radial surface associated with base portion 34 of hook 32, it is appreciated that the function associated with pin could be provided in other methodologies. For instance, the outer radial surface of base portion 34 of hook 32 could be provided with a contour such as a lobe or the like that is constructed to cooperate with a projection or pin that extends in an inboard lateral direction relative to the insert 60 and/or cover 80 to provide the desired cooperation between insert 60, cover 80, and hook 32 that facilitates the selective rotational association between insert 60 and cover 80 and hook 32. Said in another way, it is appreciated that various configurations could be provided between hook 32 and insert 60 and/or cover 80 wherein a first portion of the range of rotation of insert 60 causes only generally lateral translation of hook 32 relative to an underlying carriage and a second portion of the range of rotation of insert 60 relative to hook 32 causes eccentric rotation of hook 32 relative to the underlying carriage. Regardless of the configuration of the specific physical interference between hook 32 and insert 60, the selective rotational interaction between the eccentric pivot assembly and hook 32 is selectively operable in reverse rotational directions associated with operation of the drive shaft associated with shaft opening 70.

FIG. 9 illustrates a cross section of the hook assembly 30 when the dowel pin 90 is located at a first end of insert slot 72 and cover slot 88. Insert 60 and cover 80 are rotatable relative to hook 32 as pin 90 travels between the first end of the slots 72, 88 and the second end of the slots 72, 88 as shown in FIG. 11. Thus, as noted previously, the configuration of the slots 72, 78 limits movement of insert 60 and cover 80 around the circular base portion 34 of hook 32 to those positions shown in FIGS. 9 and 11 and any positions therebetween.

Referring to FIGS. 10-13, when in use, hook 32 is used to generally engage a portion of the vehicle or vehicle frame member, such as a vehicle guard or an underride guard 92. Such underride guards are normally generally horizontally oriented and disposed near the rear portion of a vehicle. The hook 32 can be moved relative to the underride guard 92 of a truck via operation of the vehicle restraint device that effectuates rotation of the shaft associated with pivot hole 70. The underride guard 92 may slide in a horizontal direction along the upper surface 44 of the shank 40 and in a limited vertical direction along the side surface 46 associated with the crown 42. Ultimately, when engaged with a generally open tubular structured underride guard, tooth 50 associated with hook 32 cooperates with an upward facing surface of underride guard 92 to secure the vehicle relative to the loading dock, as can best be seen in FIG. 10. If the tooth 50 is initially loosely engaged with the guard 92, continued rotation of the hook in a generally upward direction toward a dock area results in vehicle restraint device more tightly engaging the underride guard 92.

Figure 10:
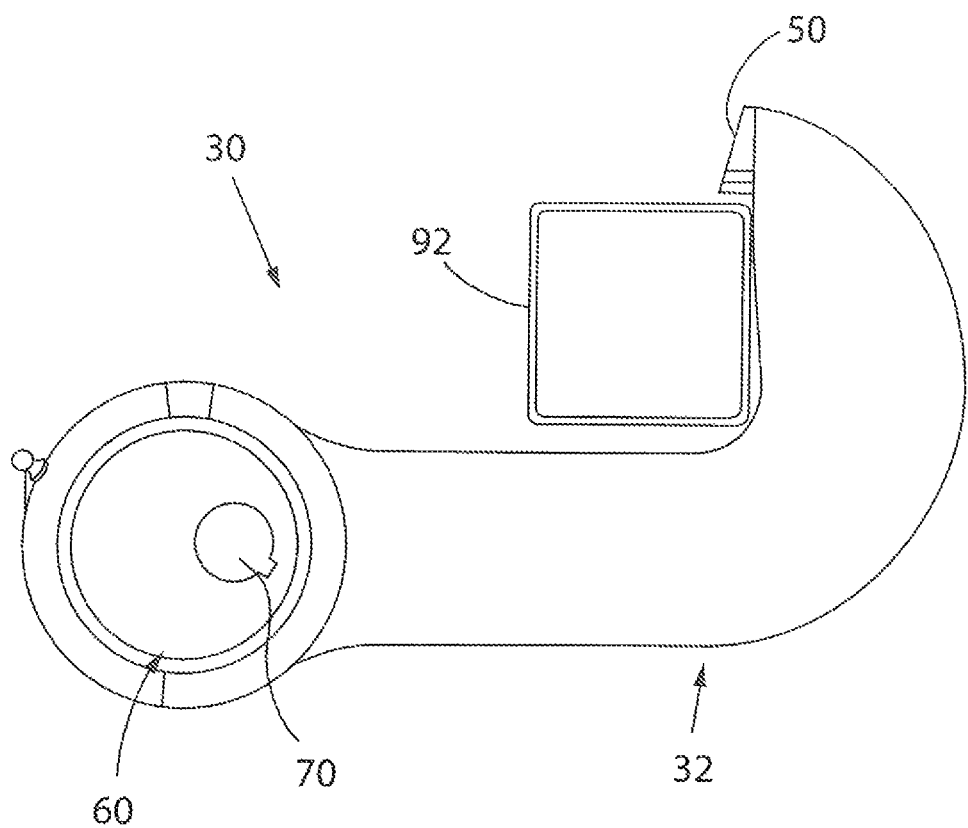
FIG. 10 is a side elevation view of the restraint, insert, and cover shown in FIG. 8 with a vehicle frame member or underride guard associated therewith and the restraint oriented in an engaged orientation relative to the restraint.

Referring to FIG. 9, hook assembly 30, and more specifically dowel pin 90, insert 60, and cover 80 are in a first position. FIG. 10 shows the hook assembly 30 in the same relative orientation as FIG. 9 when the hook 32 is engaged with the underride guard 92. When the tooth 50 is engaged with the underride guard 92, the hook 32 cannot be rotated downwardly away from the vehicle due to the inferring interaction of guard 92 with tooth 50. In accordance with the present invention, in order to disengage the hook tooth 50 from the underride guard 92, hook assembly 30 moves in a generally forward lateral direction relative to guard 92. That is, rotation of insert 60 and cover 80 relative to outer rim 36 of hook 32, due to the eccentric association therebetween and the rotational translation associated with grooves or slots 72, 88 and pin 90, accommodates generally lateral translation of body 39, including hook 32, during rotation of the drive shaft associated with pivot hole 70.

Figure 12:
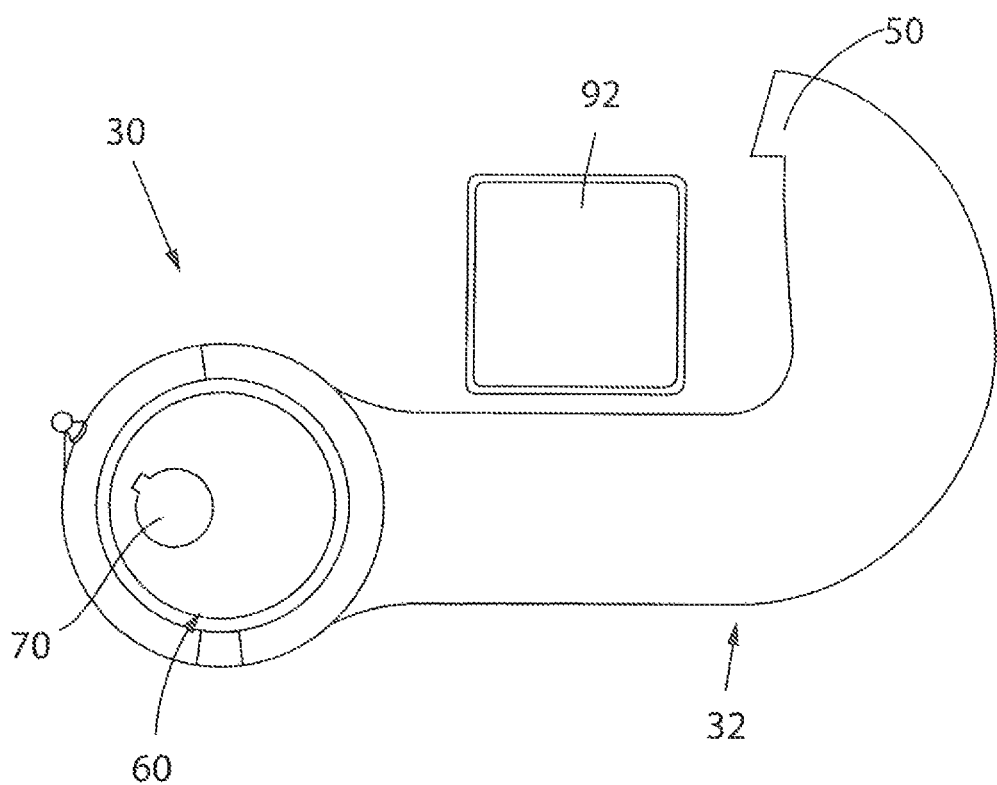
FIG. 12 is a view similar to FIG. 10 with the restraint oriented in a second or intermediate orientation relative to the underride guard of a vehicle guard during engagement and disengagement translation of the restraint relative thereto.

When dowel pin 90 interacts with end of slots 72, 88, continued rotation of the shaft associated with pivot hole 70 effectuates rotation of body 39 (and associated hook 32) in respective clockwise and counterclockwise directions. This rotates hook 32 into and out of an orientation where the hook interferes with or allows lateral translation of a vehicle guard relative thereto. Continued rotation of insert 60 and cover 80 in a clockwise direction from the position shown in FIG. 9 to the position shown in FIG. 11, as indicated by the orientation of slot 72, results in forward lateral movement of the hook 32 as a result of the eccentric association between insert 60, cover 80, and hook body 39. This is best seen in FIG. 12, which shows the hook assembly oriented at a generally forward orientation relative to vehicle guard 92 when insert 60, cover 80, and body 39 are in the orientations shown in FIG. 11 as evidenced by the forwarded oriented position of the eccentric lobe defined by insert 60 with respect to the axis of rotation associated with keyed drive shaft or pivot hole 70. As hook 32 traverses toward the forward position shown in FIG. 12, tooth 50 achieves an orientation wherein tooth 50 clears the underride guard 92, and hook assembly 30 can be rotated downwardly away from the vehicle in response to continued clockwise rotation of the drive shaft associated with pivot hole 70. Such continued rotation allows tooth 50 and crown side surface 46 to rotate to an orientation out of interference with guard 92 such that a vehicle associated with guard 92 can be removed or disengaged from the vehicle restraint system associated with hook 32.

Figure 13:
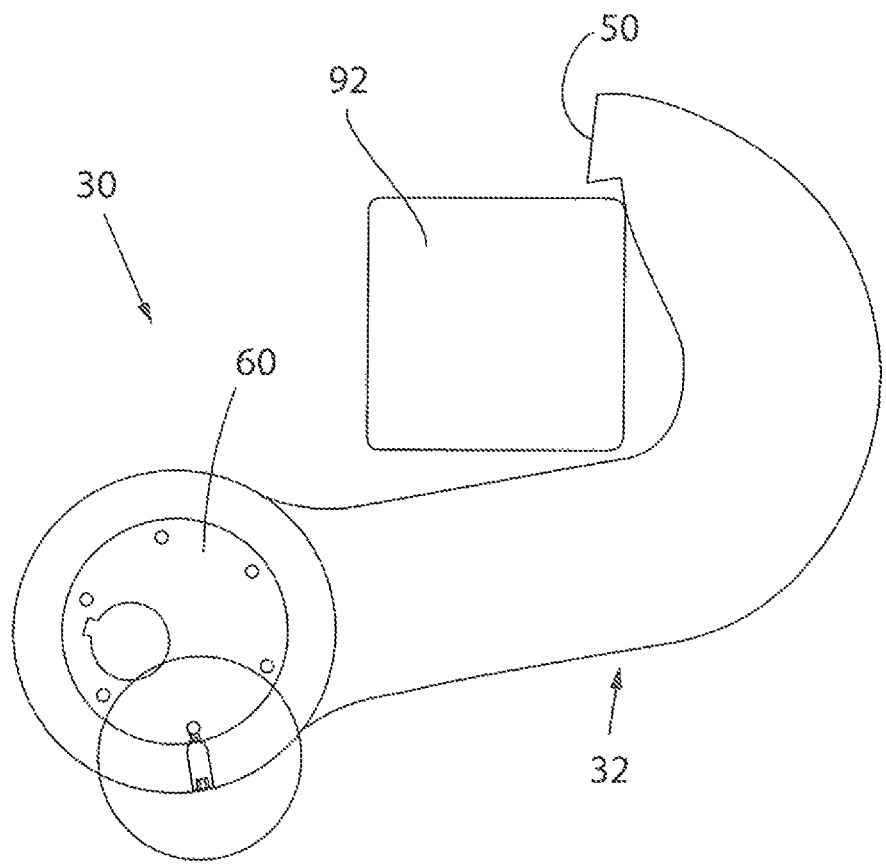
FIG. 13 is a side elevation view of the restraint and insert assembly oriented in an engaged orientation relative to an underride guard associated therewith.
Figure 14:
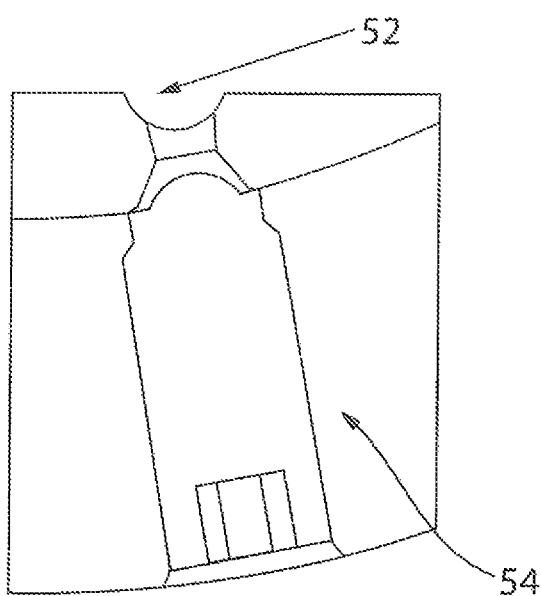
FIG. 14 is an elevation detail cross section view of the restraint, insert, and cover assembly taken along line 14-14 shown in FIG. 13.

It is appreciated that additional and/or alternate components and/or arrangements may be used to facilitate the eccentric movement of insert 60 and cover 80 about opening 38 defined by hook 32. For instance, as shown in FIGS. 13 and 14, in an alternate embodiment, hook assembly 30 can be provided with a ball 54 and detent 52 arrangement configured to retain hook 32 in an extended position until it contacts the underride guard 92. Once the underride guard 92 is contacted, the force associated with the initial contact unseats ball 54 from a ball detent 52 defined by insert 60 such that insert 60 can continue to rotate and bias the underride guard 92 toward the dock. The ball 54 and opening or detent 52 are shown in more detail in FIG. 14. When the operator wishes to detach the hook assembly 30 from the underride guard 92, the insert 60 and cover 80 can again be rotated from the position shown in FIG. 9 to the position shown in FIG. 11 so that the hook tooth 50 clears the underride guard 92, and the hook 32 can be rotated in a generally downward direction so that the vehicle can be disengaged from the retaining system.

It should be noted that although the above description contemplates limited rotation of the insert and cover by using a dowel pin and corresponding slots or a dowel pin and detent, rotational movement and restriction thereof could be achieved in other ways as would be known to one skilled in the art.

Figure 15:
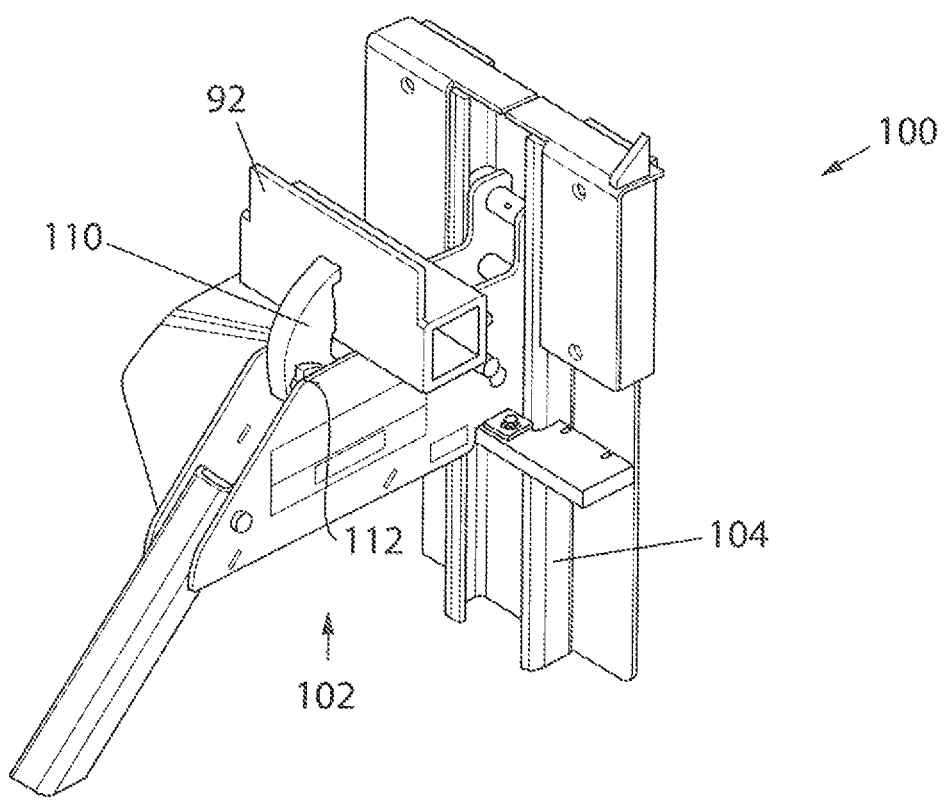
FIG. 15 is a perspective view of the restraint shown in FIGS. 10-13 supported by a carriage associated with a vehicle restraint assembly according to the present invention with a vehicle underride guard associated therewith.
Figure 16:
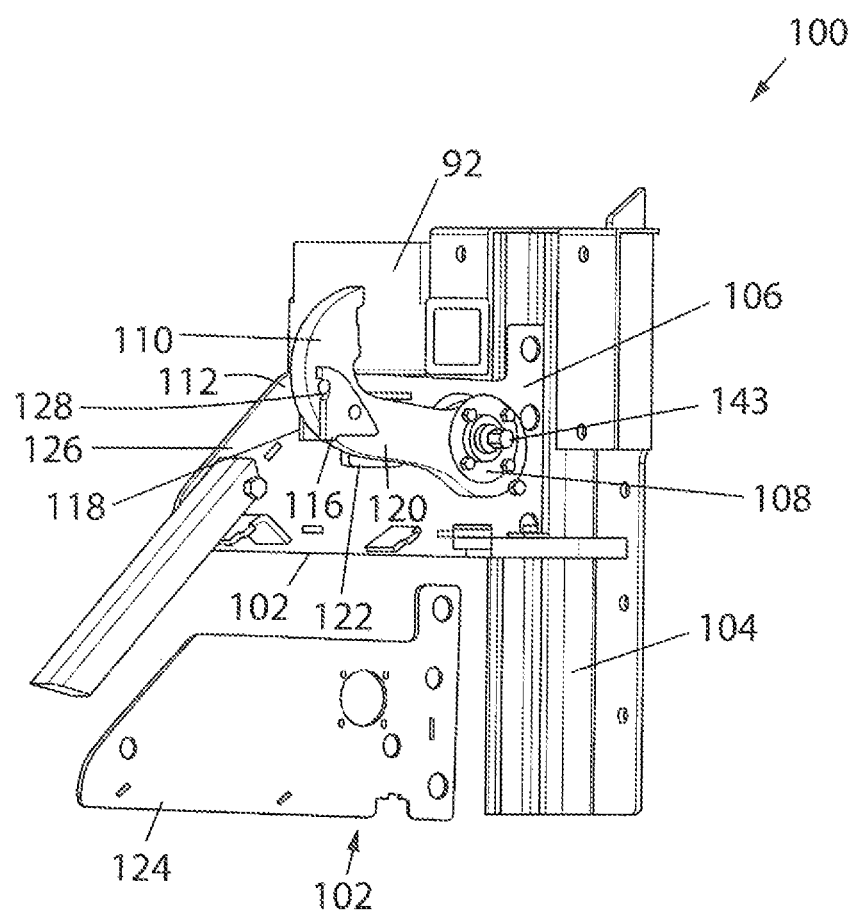
FIG. 16 is a view similar to FIG. 15 with a side panel of the carriage exploded from the vehicle restraint assembly.
Figure 17:
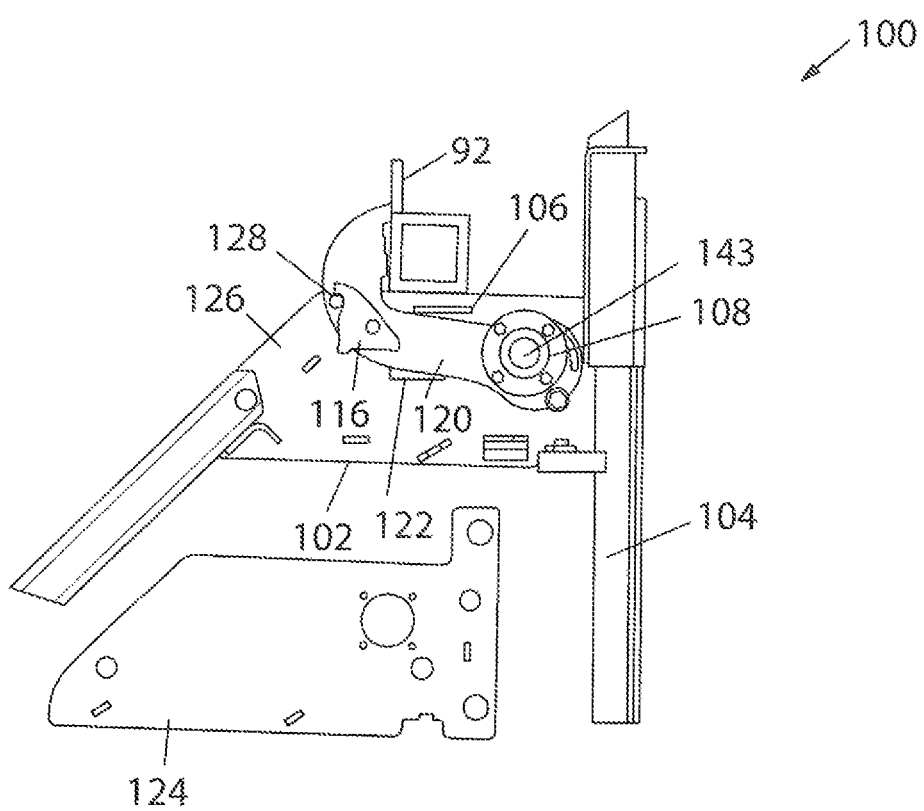
FIG. 17 is a side elevation view of the assembly shown in FIG. 16.

FIGS. 15-29 show various views of a vehicle restraint system 100 according to another embodiment of the present invention. Vehicle restraint system 100 includes a carriage or carriage assembly 102 that slideably cooperates with a rail 104 that is configured to be secured to a generally vertical support structure, such as a wall, oriented generally below a discrete loading dock area. Vehicle restraint system 100 includes a restraint or hook assembly 106 that is movable or rotatable relative to carriage assembly 102 in a manner similar to that described above with respect to hook assembly 30. That is to say, hook assembly 106 is secured to carriage assembly 102 via an eccentric pivot assembly or eccentric pivot 108 similar to that described above with respect the hook assembly 30 to include an insert and a cover so that hook portion 110 of hook assembly 106 is movable between a disengaged or retracted position and an extended or engaged position as shown in FIGS. 15 and 16 to allow selective securing or release of an underride guard 92 relative to vehicle restraint system 100. It should be appreciated that hook assembly 30 described above is constructed to cooperate with carriage assembly 102 so as to be operable with respect to engagement and disengagement with a vehicle frame member in the manner described above and as described below.

It should be appreciated that when retracted, hook portion 110 of hook assembly 106 is disposed generally below upper surface 112 of carriage assembly 102 such that the hook assembly 106 does not otherwise interfere with the longitudinal translation of a vehicle underride guard relative to the vehicle restraint system 100. When engaged or oriented in an extended position relative to carriage assembly 102, hook portion 110 extends generally above upper surface 112 of carriage assembly 102 so as to selectively interfere with outward longitudinal translation of underride guard 92 relative to restraint system 100 in a manner similar to that described above with respect to hook assembly 30.

As shown in FIGS. 16-29, unlike hook assembly 30, vehicle restraint system 100 includes a hook position securing system that mitigates undesired translation of the hook assembly relative to the carriage assembly during certain situations associated with engagement of the hook assembly 106 with a respective underride guard 92. Vehicle restraint system 100 includes a first latch 116 and a second latch 118 that are each rotationally supported along generally opposite lateral sides of a hook 120 of hook assembly 106. As disclosed further below, each latch 116, 118 is oriented and constructed to cooperate with a respective stop 122 associated with the respective side panel 124, 126 of carriage assembly 102. Each latch 116, 118 is also constructed to selectively cooperate with a respective catch 128 that extends in an outward lateral direction relative to hook 120. As disclosed further below, respective latches 116, 118; stops 122; and catches 128 are constructed and oriented to cooperate with the eccentric motion of hook 120 relative to carriage assembly 102 to achieve the desired selectively securable interaction of hook 120 with underride guard 92 and to selectively maintain hook 120 in the extended orientation relative to carriage assembly 102 when desired.

Figure 18:
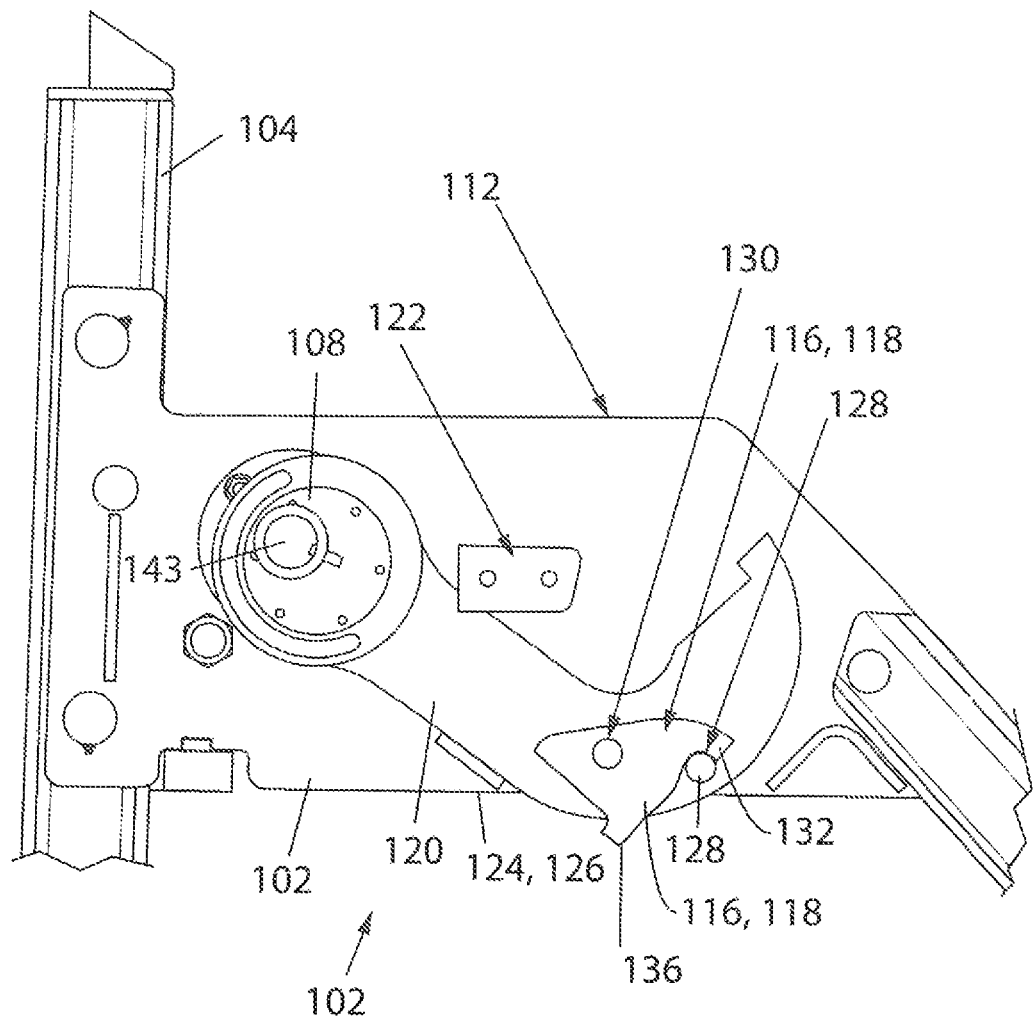
FIGS. 18-25 are various side elevation views of a portion of the vehicle restraint assembly shown in FIG. 16 with an opposite side panel of the carriage removed therefrom and the restraint moving sequentially through a retracted or disengaged orientation relative to the carriage toward an engaged orientation relative to the carriage and an underride guard.

Referring to FIG. 18, when retracted, hook 120 is disposed generally between panels 124, 126 of carriage assembly 102. Latches 116, 118 are preferably freely rotatable relative to pivot 130 such that a projection 132 associated with each latch 116, 118 rests upon a respective catch 128 supported by hook 120. Each latch 116, 118 further includes an optional lobe 136 that is also constructed to cooperate with catch 128 and oriented to prevent over rotation of the respective latches 116, 118 relative to hook 120. Lobes 136 also manipulate the position of the center of gravity associated with latches 116, 118 such that the center of gravity maintains a desired offset or over center orientation of the center of gravity relative to the axis associated with pivot 130 for the reasons described further below with respect to FIGS. 27-28.

Figure 19:
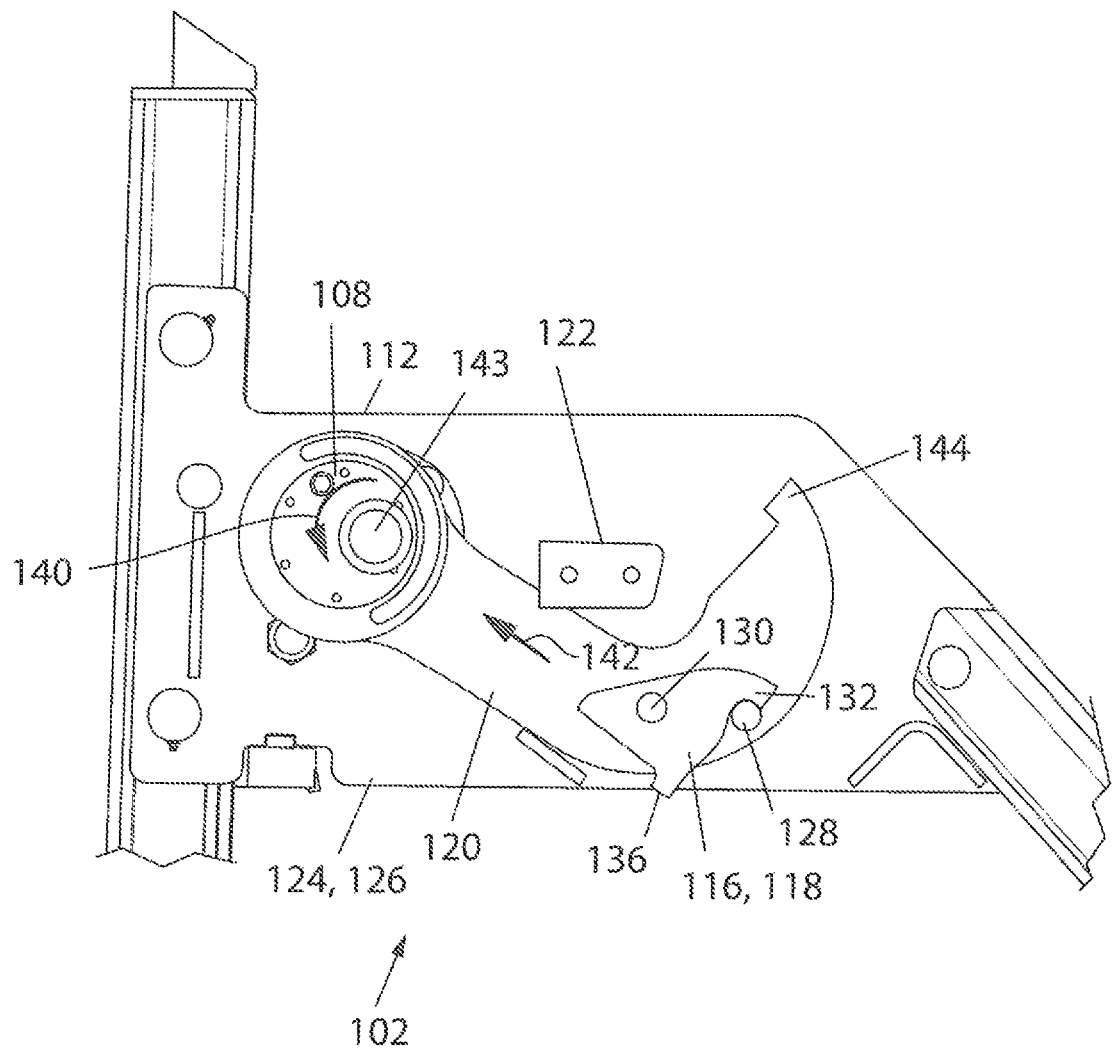
Figure 20:
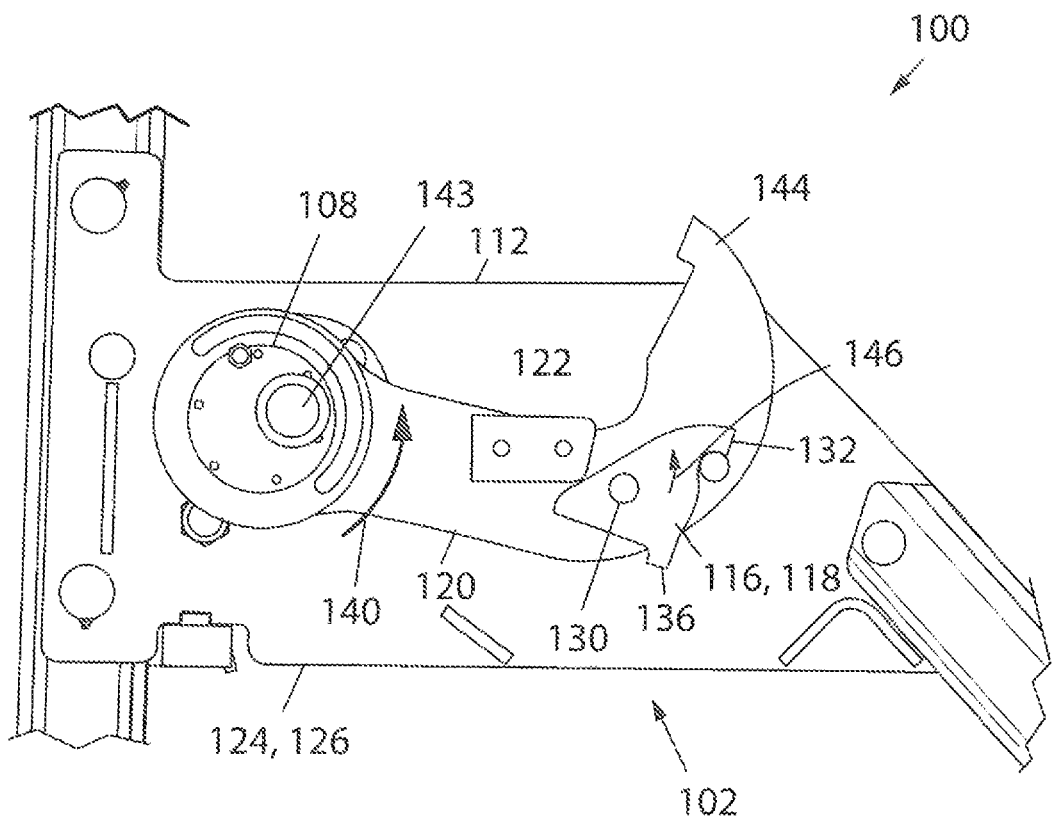
Figure 21:
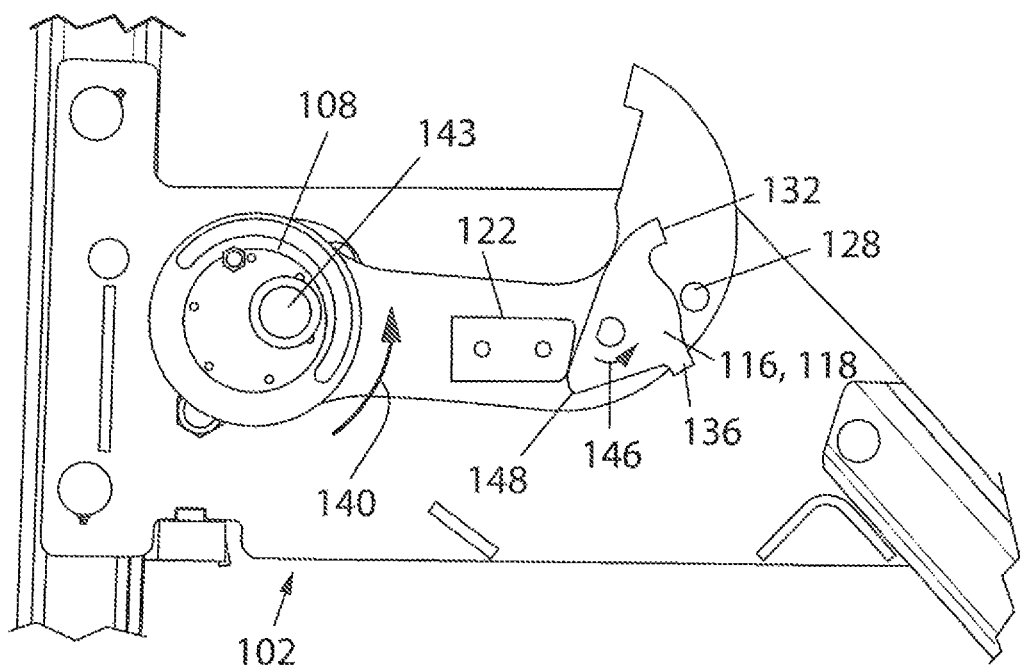
Figure 22:
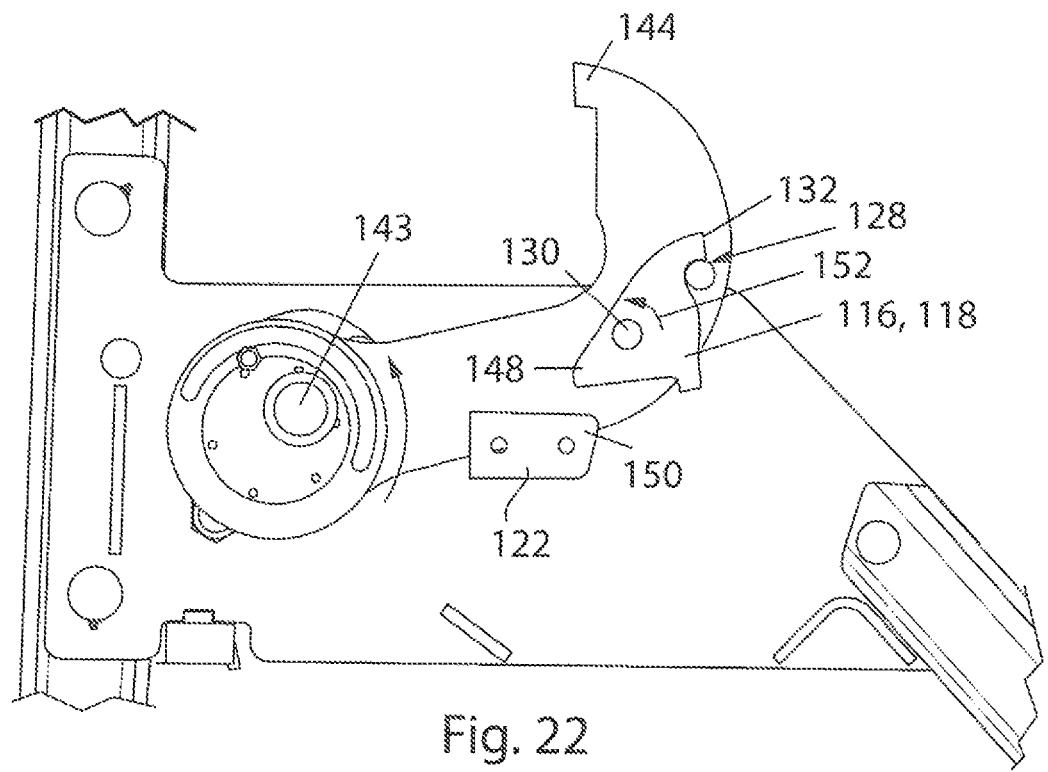

Referring to FIG. 19, when the user wishes to restrain an underride guard 92 associated with upper surface 112 of carriage assembly 102, counterclockwise rotation, indicated by arrow 140, associated with the eccentric insert or pivot 108 initiates upward and rearward translation, indicated by arrow 142, of hook 120 relative to carriage assembly 102. Referring to FIGS. 20-24, as hook 120 progresses towards an extended position in response to rotation of drive shaft 143, a distal end 144 of hook 120 progresses above upper surface 112 of carriage assembly 102 as eccentric pivot 108 continues rotation in direction 140. During actuation of vehicle restraint system 100 toward an engaged orientation, latches 116, 118 impinge upon a surface of stops 122 but are allowed to rotate about pivot 130 in direction 146 such that projection 132 translates away from catch 128 until a rear portion 148 of respective latches 116, 118 clears the respective stops 122, as shown in FIG. 22. It is appreciated that the operation of drive shaft 143 can be provided in various operational modalities such as by electrical means (i.e. a motor or the like), hydraulic means (i.e. a hydraulic pump, motor, or the like), a pressurized flow means (i.e. an air pump, motor or the like), or combinations of one or more such operational modalities to achieve the desired bidirectional rotational operation of drive shaft 143.

Figure 23:
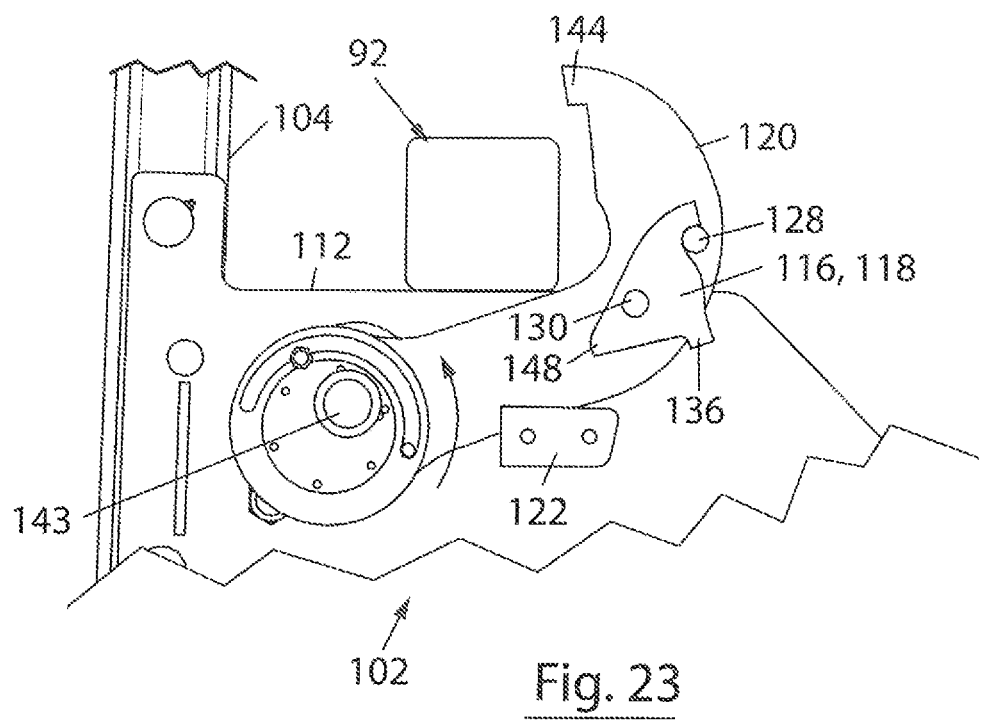
Figure 24:
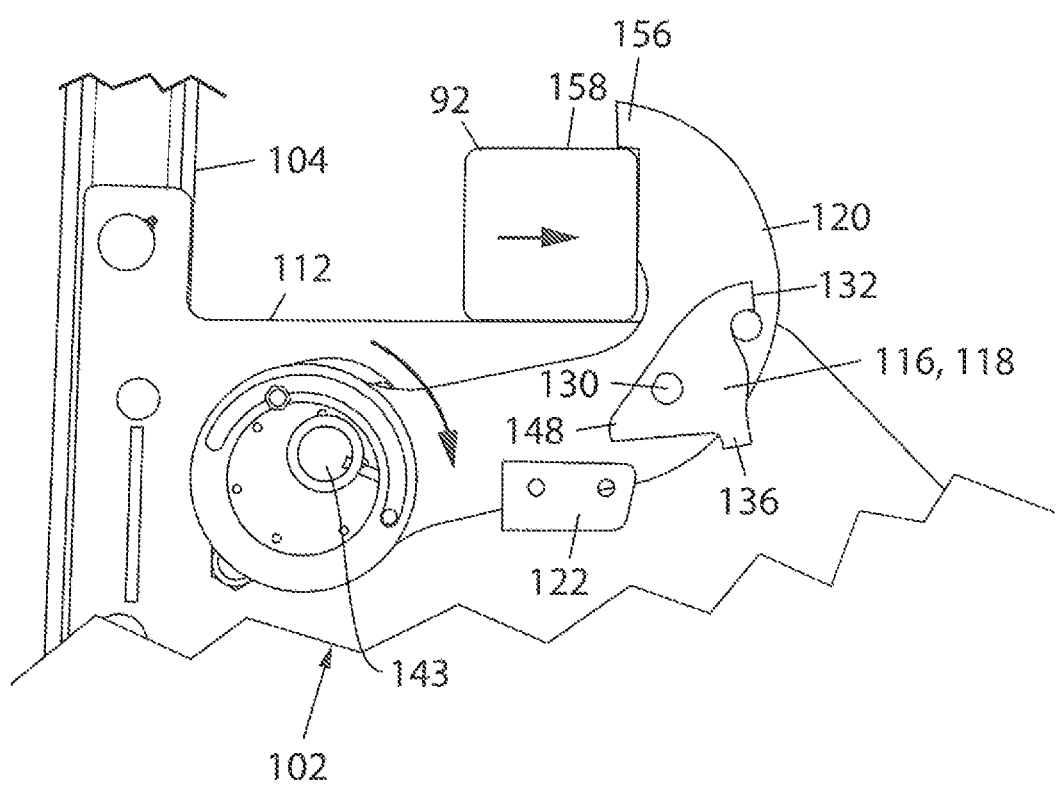

Once rear portion 148 of respective latches 116, 118 clear an upper forward portion 150 of respective stops 122, latches 116, 118 rotate in an opposite direction relative to the direction associated with the latches bypassing of stops 122, as indicated by arrow 152, about respective pivots 130 such that projections 132 come to rest upon catches 128. Referring to FIGS. 23 and 24, underride guard 92 can be effectively retained between hook 120 and rail 104 along upper surface 112 of carriage assembly 102 when hook 120 is extended even though latch 116, 118 may be offset from stop 122. Preferably, when hook 120 is engaged, eccentric pivot 108 achieves and maintains an overcenter orientation of the cam shaft associated with the insert and cover associated with eccentric pivot 108 to resist translation of the hook relative to the carriage due to loading of the hook by the underride guard. Preferably, the eccentric pivot assembly maintains an orientation wherein the cam shaft is approximately 30 degrees past center to resist translation of the hook due to loading associated with the underride guard. For those configurations wherein a tooth 156 associated with hook 120 can engage a top or upper surface 158 associated with underride guard 92, the cooperation of tooth 156 with underride guard 92 prevents undesirable or unexpected disengagement of hook 192 from underride guard 92.

Figure 25:
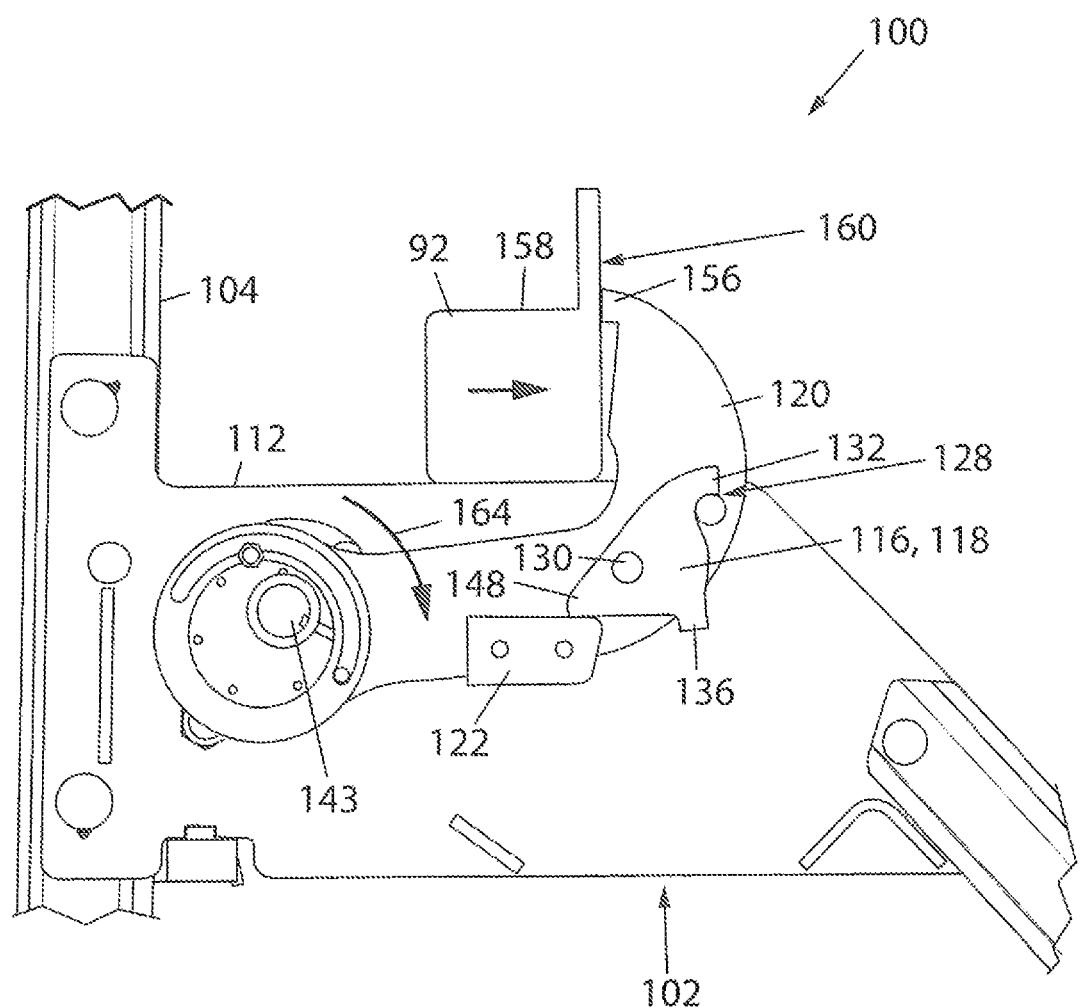
Figure 26:
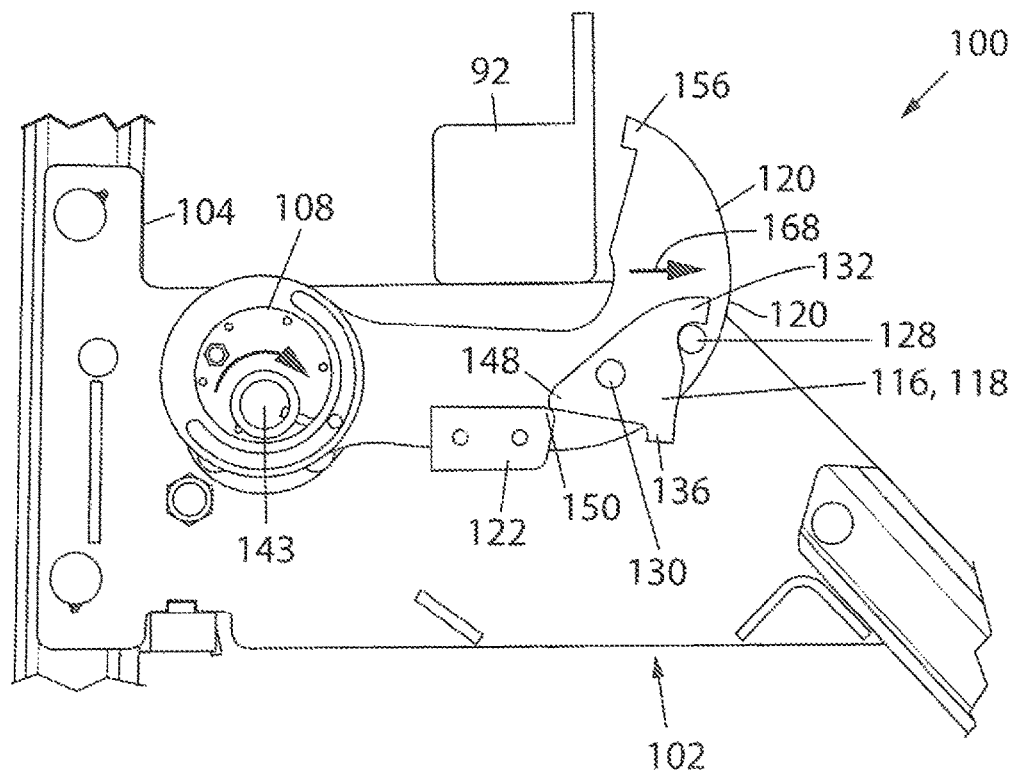
FIG. 26 is a view similar to FIGS. 18-25 and shows the restraint translated away from the engaged position relative to the carriage and translation of a latch and a catch relative to one another to facilitate disengagement of the vehicle underride guard from the vehicle restraint system.

Referring to FIG. 25, in some situations, such as if a plate, brace, or gusset 160 interferes with a secure cooperation of tooth 156 of hook 120 with upper surface 158 of underride guard 92, rear portions 148 of latches 116, 118 impinge upon stops 122 as projections 132 impinge upon catches 128. It should be appreciated from the orientation of latches 116, 118 shown in FIG. 25 and when hook 32 and insert 60 are oriented relative to one another at the over-center orientation as disclosed above, that the cooperation of latches 116, 118 with stops 122 and catches 128 prevents downward rotation, indicated by arrow 164, of hook 120 relative to carriage assembly 102 thereby restraining underride guard 92 between hook 120 and rail 104 along upper surface 112 of carriage assembly 102. When it is desired to allow disengagement of underride guard 92 from vehicle restraint system 100, eccentric pivot assembly 108 operates to facilitate initial generally lateral translation, indicated by arrow 168, of hook 120 relative to carriage assembly 102 as described above. During disengagement operation of the eccentric pivot assembly 108, latches 116, 118 translate in a generally forward direction relative to stops 122 such that rear portion 148 of latches 116, 118 can pass beyond the upward forward portion 150 of respective stops 122. Such translation of hook 120 allows latches 116, 118 to bypass stops 122 such that hook 120 can be translated in a generally forward and downward direction, indicated by arrow 170, during continued operation or rotation of the eccentric pivot 108 associated with hook 120. The continued forward and downward translation of hook 120 relative to carriage assembly 102 allows underride guard 92 to be removed from the vehicle restraint system 100 as hook 120 achieves a fully retracted orientation relative to carriage assembly 102.

Figures 27, 28:
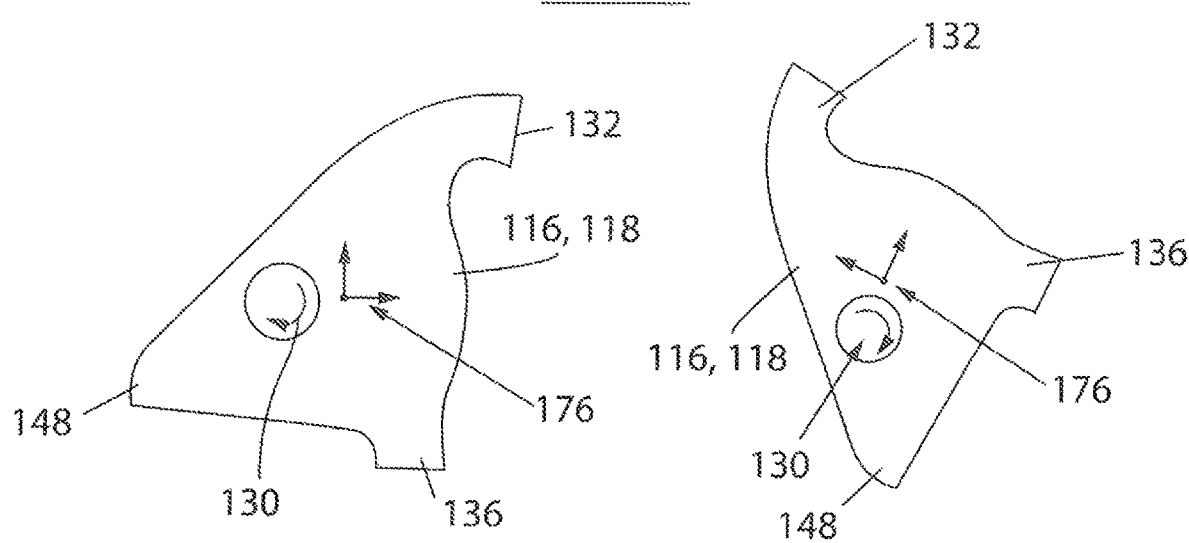
FIGS. 27-28 are elevational views of the latch shown in FIGS. 18-26 and show the gravitational translation of the latch.
Figure 29:
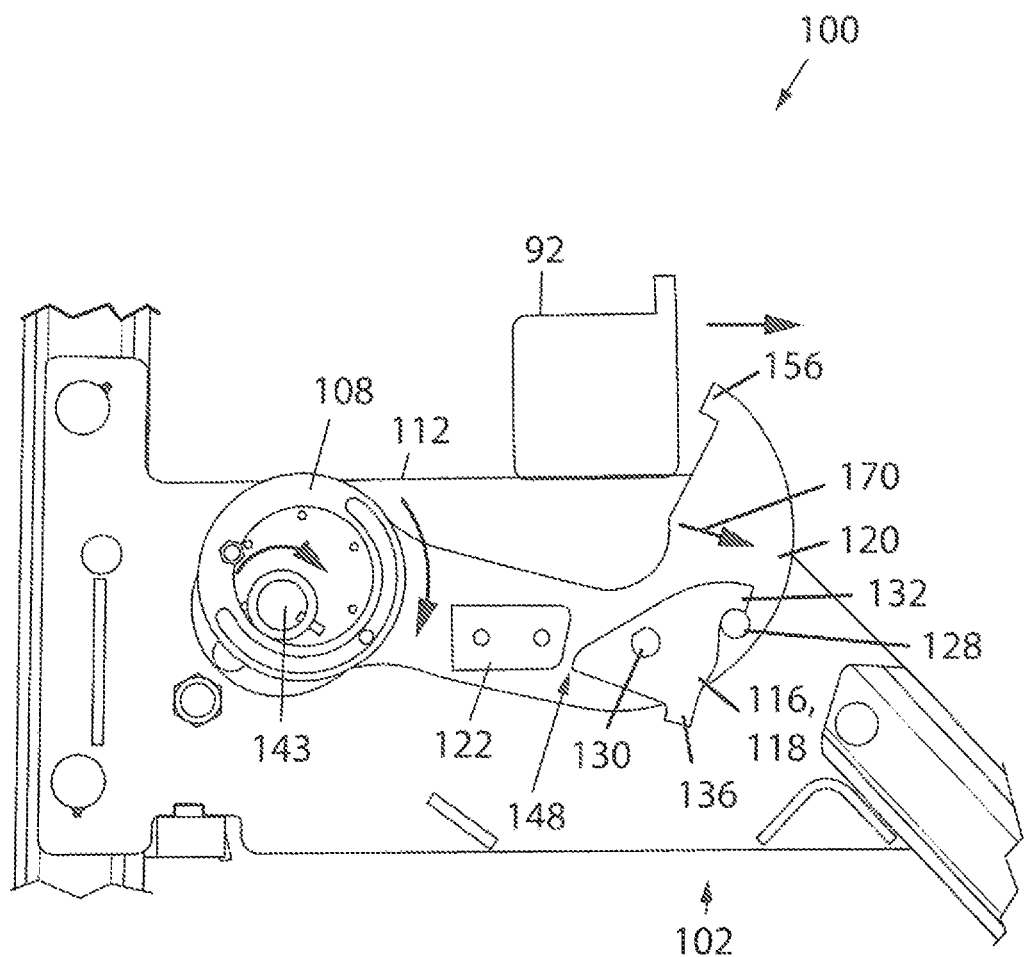
FIG. 29 is a view similar to FIGS. 18-26 and shows the latch and catch operationally dissociated to facilitate translation of the vehicle restraint toward a retracted or stowed position relative to the carriage such that the restraint does not interfere with translation of the vehicle in a disengage direction relative to the vehicle restraint system.

As alluded to above and referring to FIGS. 27-28, latches 116, 118 are constructed such that a center of gravity 176 associated with each latch 116, 118 is disposed between the axis associated with pivot 130 and projection 132. Preferably, the center of gravity of latches 116, 118 is maintained at locations forward of the axis associated with pivot 130 throughout the range of motion of hook 120 relative to carriage assembly 102. That is, whether latch 116, 118 is oriented to be engaged with a respective catch 128 or in an orientation wherein the respective latch 116, 118 is bypassing the respective stop 122 during raising of the cantilevered distal end of hook 120 as shown in FIG. 28, center of gravity 176 is maintained generally forward or at an offset or over-center orientation relative to the axis associated with pivot 130 such that latches 116, 118 are gravitationally biased to rotate in a generally clockwise direction relative to the orientation shown in FIGS. 27-28. Such a consideration ensures that latches 116, 118 are oriented for the desired cooperation with stops 122 and catches 128 throughout the range of motion of hook assembly 120 relative to carriage 102 and associated with operation of eccentric pivot 108 and for each engagement/disengagement associated with the cyclic operation of the vehicle restraint system 100. It is further appreciated that a biasing device, such as a spring or the like, could also be provided to maintain latches 116, 118 in the desired position and/or orientation to achieve the selective interference with stops 122 in the manner described above.

It is appreciated that the construction and orientation of latches 116, 118; stops 122, and catches 128 could be provided in other configurations. For example, it is envisioned that stops 122 could be secured to hook 120 rather than carriage assembly 102 and configured to bypass a latch secured to the carriage assembly 102. Although two latch, stop, and catch associations are shown, it is also further appreciated that fewer such associations can be provided. Although shown as generally being enclosed by carriage assembly 102, it is further appreciated that one or more of the structures associated with the operation of hook, latch, catch, and/or stop could be external thereto. Such modifications are considered encompassed by the appending claims.

Figure 30:
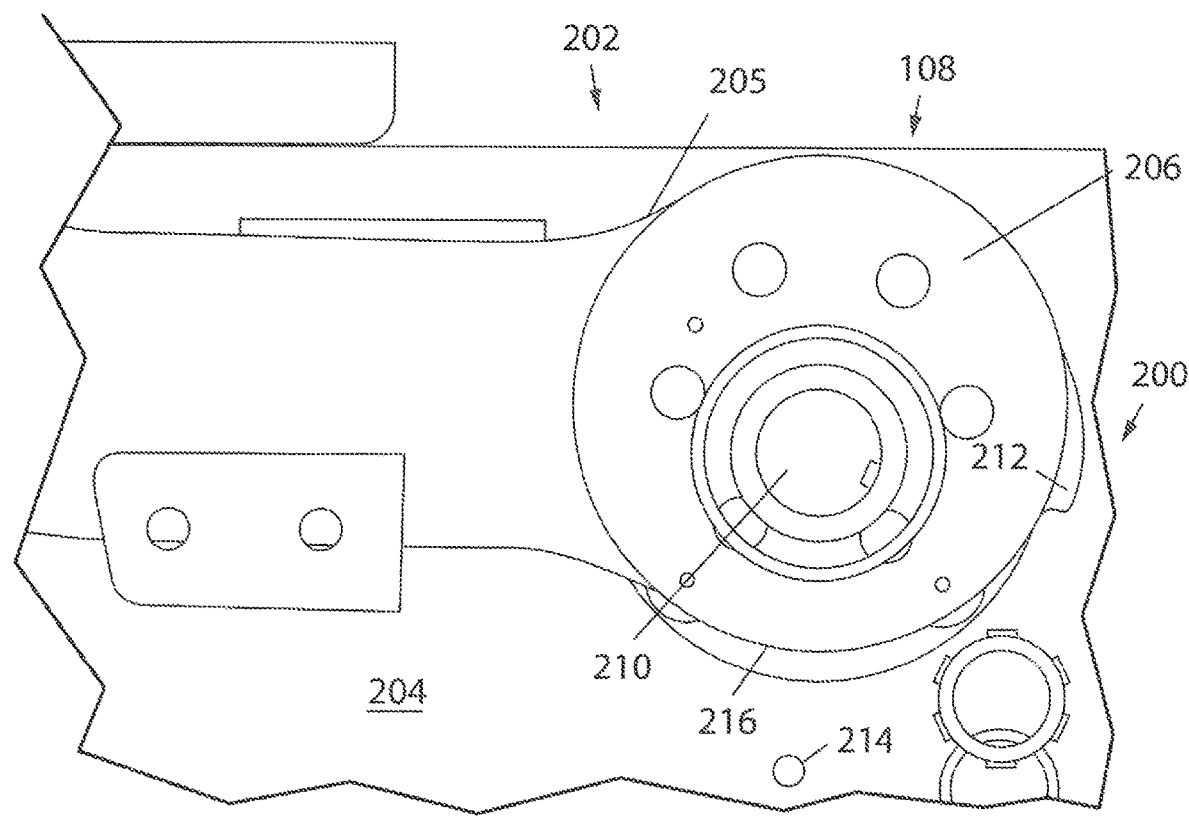
FIGS. 30 and 31 are an elevation and perspective view, respectively, of a portion of a restraint and a carriage according to another embodiment of the invention and constructed to prevent over rotation of the restraint relative to the carriage.
Figure 31:
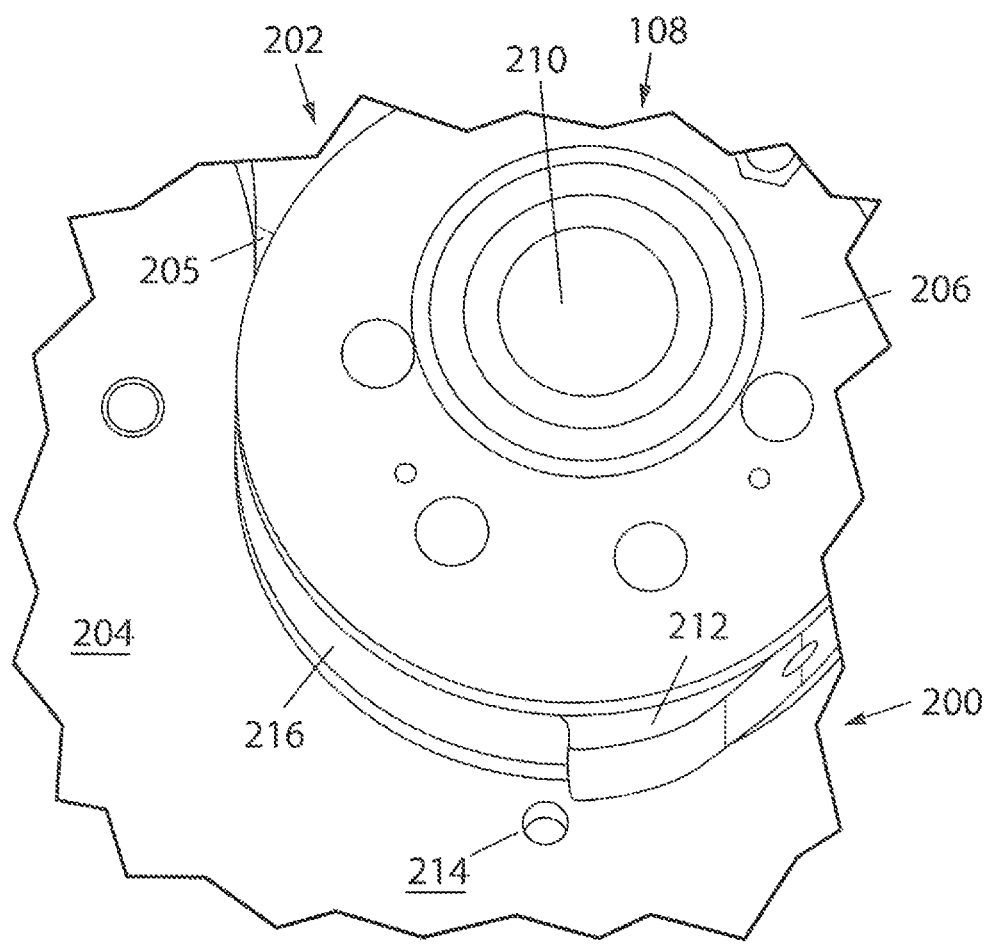

FIGS. 30 and 31 show views of an optional stop assembly 200 that can be included in either of hook assembly 30 and/or hook assembly 106 of restraint system 100 and is constructed to prevent rotation of an eccentrically mounted restraint, hook, or hook assembly 202 relative to a carriage 204 beyond a desired threshold. Like hook assemblies 30, 106, hook assembly 202 includes a base portion 205 that is configured to cooperate with an insert 206 to effectuate eccentric motion of hook assembly 202 relative to a carriage 204 in response to rotation of a drive shaft 210 as disclosed above. Unlike hook assemblies 30, 106, hook assembly 202 includes a stop or lobe 212 that extends in a generally outward radial direction from base portion 205 of hook assembly 202. Lobe 212 is circumferentially oriented relative to base portion 205 of hook assembly 202 to selectively impinge upon a projection or a post (not shown) that traverses the cavity defined by carriage 204. The position of the post is represented in FIGS. 30 and 31 as a hole or opening 214 formed in respective side panels associated with carriage 204. Preferably, each side panel associated with carriage 204 includes an opening 214 that is aligned with a corresponding opening formed in the opposite side panel such that that a bolt or a pin can be associated with each of the respective openings 214. It should be appreciated from the orientation shown in FIGS. 30 and 31 that the post would extend in a direction generally normal to the view shown in FIGS. 30 and 31.

Upon rotation of hook assembly 202 toward a fully extended position relative to carriage 204, lobe 212 associated with hook assembly 202 impinges upon the post thereby preventing further rotation of the hook assembly 202 relative to carriage 204. From a comparison of FIGS. 30 and 31, it should be appreciated that the eccentric operation associated with eccentric pivot 108 associated with the cooperation of hook assembly 202 and carriage 204 results an outer radial surface 216 of hook assembly 202 appearing closer to the post or opening 214 as hook assembly 202 rotates relative to carriage 204. That is, as shown in FIG. 30, opening 214 is further from surface 216 of hook assembly 202 and in response to the eccentric motion of hook assembly 202 relative to carriage 204 during clockwise rotation of drive shaft 210, with respect to the orientation shown in FIGS. 30 and 31, surface 216 gradually approaches opening 214 as lobe 212 nears interference with the post associated with opening 214. Such a construction provides a robust impediment for preventing rotation of hook assembly 202 relative to carriage 204 beyond a desired rotational position associated with engagement of hook assembly 202 with a respective vehicle structure. Lobe 212 and the post associated with opening 214 improve the service life associated with the cyclic operation of a vehicle restraining system having such a construction.

The present invention has been described in terms of the preferred embodiments, the embodiments disclosed herein are directed to the assembly as generally shown in the drawings. It is recognized that equivalents, alternatives, and modifications, aside from those expressly stated, to the embodiments summarized, or the embodiments shown in the drawings, are possible and within the scope of the appending claims. The appending claims cover all such alternatives and equivalents.

We claim:

1. A vehicle restraint system for securing a vehicle relative to a loading dock, the vehicle restraint system comprising:
   a mount configured to be secured to the loading dock;
   a drive shaft operatively connected to the mount;
   an actuator connected to the drive shaft for rotation of the drive shaft in a first direction and a second direction opposite the first direction; and
   a restraining member connected to the drive shaft and movable from a retracted position to an extended position based on rotation of the drive shaft in the first direction by the actuator, the restraining member movable from the extended position to the retracted position based on rotation of the drive shaft in the second direction by the actuator, wherein the restraining member, in the extended position, is configured to engage a vehicle structure;
   wherein the restraining member has an intermediate position, the restraining member movable from the extended position to the intermediate position by movement of the vehicle structure away from the loading dock, and
   wherein rotation of the drive shaft in the second direction when the restraining member is at the intermediate position causes a releasing lateral translation of the restraining member away from the mount and toward the retracted position to disengage the restraining member from the vehicle structure.

2. The vehicle restraint system of claim 1 wherein rotation of the drive shaft in the first direction when the restraining member is in the retracted position causes engaging lateral translation of the restraining member toward the mount.

3. The vehicle restraint system of claim 2 wherein continued rotation of the drive shaft in the first direction after the engaging lateral translation of the restraining member causes rotation of the restraining member toward the extended position.

4. The vehicle restraint system of claim 1 further comprising:
   a stop;
   a catch carried on the restraining member; and
   a latch pivotally carried on the restraining member;
   wherein the latch engages the stop and the catch to inhibit rotation of the restraining member toward the retracted position.

5. The vehicle restraint system of claim 1 wherein the drive shaft is connected to the restraining member via an insert received at least partially in the restraining member.

6. The vehicle restraint system of claim 5 wherein, with the restraining member in the retracted position, rotation of the drive shaft in the first direction turns the insert relative to the restraining member and causes an engaging lateral translation of the restraining member toward the mount.

7. The vehicle restraint system of claim 6 wherein continued rotation of the drive shaft in the first direction after the engaging lateral translation causes abutment of surfaces of the insert and restraining member, and the abutment rotating the insert together with the restraining member toward the extended position.

8. The vehicle restraint system of claim 1 wherein the drive shaft is connected to the restraining member via an insert; and
wherein an axis of rotation of the drive shaft is coaxial with respect to an axis of rotation of the insert.

9. The vehicle restraint system of claim 1 further comprising:
an insert that connects the drive shaft and the restraining member, the insert including one of a slot and a pin;
wherein the restraining member includes the other of the slot and the pin; and
wherein rotation of the drive shaft abuts surfaces of the pin and the slot to cause rotation of the restraining member.

10. The vehicle restraint system of claim 1 wherein the mount includes a rail, the vehicle restraint system further comprising:
a carriage body supporting the drive shaft and the restraining member, the carriage body slidable along the rail.

11. The vehicle restraint system of claim 1, further comprising:
a carriage body supporting the drive shaft and the restraining member;
a latch pivotably attached to one of the restraining member and the carriage body; and
a stop attached to the other of the restraining member and the carriage body and oriented to interfere with the latch to prevent rotation of the restraining member toward the retracted position when the latch is engaged with the stop and to allow the latch to travel around the stop when the restraining member moves from the retracted position toward the extended position.

12. The vehicle restraint system of claim 11 further comprising a catch attached to the one of the restraining member and the carriage body and oriented to selectively interfere with pivoting of the latch.

13. The vehicle restraint system of claim 1 wherein the actuator comprises a motor.

14. A method of controlling motion of a hook relative to a carriage of a vehicle restraint system, the method comprising:
moving a hook about an eccentric pivot from a retracted position toward an extended position such that a latch carried on the hook moves toward a stop of the carriage and a portion of the hook extends beyond the carriage;
contacting the latch carried on the hook and the stop of the carriage to cause turning of the latch relative to the hook and permit the latch to clear the stop as the hook moves from the retracted position toward the extended position;
moving the hook from the extended position toward the retracted position about the eccentric pivot to engage a portion of the latch with the stop; and
rotating the eccentric pivot to translate the hook in a generally lateral direction relative to the carriage so that the latch clears the stop and facilitates movement of the hook to the retracted position.

15. The method of claim 14 further comprising engaging a tooth of the hook with an upper surface of an underride guard of a vehicle.

16. The method of claim 14 further comprising abutting a first pair of surfaces of the eccentric pivot and the hook to rotate the hook in a first direction and abutting a second pair of surfaces of the eccentric pivot and the hook to rotate the hook in a second direction.

17. The method of claim 14 further comprising laterally translating the hook relative to the carriage prior to moving the hook about the eccentric pivot from the retracted position toward the extended position.

18. The method of claim 14 further comprising rotating a drive shaft to rotate the eccentric pivot to translate the hook in the generally lateral direction.

19. The method of claim 14 wherein rotating the eccentric pivot includes rotating an insert of the eccentric pivot in an opening of the hook.

* * * * *

UNITED STATES PATENT AND TRADEMARK OFFICE
CERTIFICATE OF CORRECTION

PATENT NO. : 11,465,865 B2
APPLICATION NO. : 16/919239
DATED : October 11, 2022
INVENTOR(S) : Jean Gadbois and John Schlintz It is certified that error appears in the above-identified patent and that said Letters Patent is hereby corrected as shown below:

On the Title Page

Abstract - Item (57):
Line 10: Change "an least" to -- at least --.

Signed and Sealed this
Fourth Day of April, 2023

Katherine Kelly Vidal
*Director of the United States Patent and Trademark Office*